US012792744B2

(12) United States Patent
Madtha et al.

(10) Patent No.: US 12,792,744 B2
(45) Date of Patent: Nov. 10, 2026

(54) SYSTEM AND METHOD FOR RISK AND USAGE SCORING OF COMMANDS ACROSS SSH SESSIONS

(71) Applicant: Oracle International Corporation, Redwood Shores, CA (US)

(72) Inventors: Jivan Joseph Madtha, Saratoga, CA (US); Srujan Jonnadula, Duvall, WA (US); Harsh Aseeja, Kirkland, WA (US); Garric Mathias, Santa Clara, CA (US); Puneet Sharma, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 101 days.

(21) Appl. No.: 19/033,960

(22) Filed: Jan. 22, 2025

(65) Prior Publication Data

US 2026/0212023 A1 Jul. 23, 2026

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC ......................... G06F 21/577; G06F 2221/034
See application file for complete search history.

(56) References Cited

U.S. PATENT DOCUMENTS 12,323,449 B1 * 6/2025 Graves ................ G06F 16/3329
2017/0034192 A1 2/2017 Schulman et al.
2020/0004618 A1 1/2020 Thornhill et al.

FOREIGN PATENT DOCUMENTS

CN 113761541 A 12/2021

OTHER PUBLICATIONS

Vlad Yakushkin; How to record SSH sessions and monitor user activity in Linux with Ekran System [Hands-on Guide]; https://securityboulevard.com/2024/05/how-to-record-ssh-sessions-and-monitor-user-activity-in-linux-with-ekran-system-hands-on-guide-2/; Security Boulevard; May 21, 2024.
Syteca Documentation; Viewing the client session risk score; https://docs.syteca.com/view/viewing-the-client-session-risk-score; printed Jan. 28, 2025.

(Continued)

*Primary Examiner* — Benjamin A Kaplan
(74) *Attorney, Agent, or Firm* — Baker Botts L.L.P.

(57) ABSTRACT

In one embodiment, a software is operable when executed to identify a log indicating executions of commands of a secure shell (SSH) session, wherein a user accesses an instance through the SSH session, identify a generic prompt that specifies a generic set of commands of interest, identify a customized prompt that specifies a customized set of commands of interest, the customized set of commands of interest being specific to an attribute associated with one or more of the user, the instance, or the SSH session, input the generic prompt, the customized prompt, and the log to a generative AI model, and generate, using the generative AI model, a risk assessment for the SSH session based on one or more executions of the generic set of commands of interest and one or more executions of the customized set of commands of interest from the executions of the commands in the log.

22 Claims, 15 Drawing Sheets

(56) References Cited

OTHER PUBLICATIONS

Syteca Documentation; Viewing alert events; https://docs.syteca.com/view/viewing-alerts-events; printed Jan. 28, 20025.
Wei Li, et al.; ResearchGate; Design and Evaluation of a Command recommendation System for Software Applications; https://www.researchgate.net/publication/220286376_Design_and_Evaluation_of_a_Command_Recommendation_System_for_Software_Applications; Jun. 2011.
Jonathan Cohen; Streamline Auditing and Secure Your Infrastructure with Upwind's SSH Session Monitoring; https://www.upwind.io/feed/streamline-auditing-and-secure-your-infrastructure-with-upwinds-ssh-session-monitoring; Feb. 26, 2024.
Privileged Session Management Interface; https://docs.cyberark.com/pam-self-hosted/14.2/en/content/pasimp/configuring-the-privileged-session-management-interface.htm#_Ref466795135; printed Jan. 28, 2025.
Enable Privileged Remote Access with Cyolo PRO; https://7608544.fs1.hubspotusercontent-na1.net/hubfs/7608544/Datasheets/Datasheet_Cyolo%20PRO.pdf; printed Jan. 28, 2025.
Warp Workflows; https://docs.warp.dev/features/warp-drive/workflows; printed Jan. 28, 2025.
SSHLOG; SSH Session Monitoring Daemon; https://github.com/sshlog/agent; printed Jan. 28, 2025.
Assaf Namer; AWS Security Blog; How to Monitor and Visualize Failed SSH Access Attempts to Amazon EC2 Linux Instances; https://aws.amazon.com/blogs/security/how-to-monitor-and-visualize-failed-ssh-access-attempts-to-amazon-ec2-linux-instances/; Aug. 2, 2017.
Patentability Search Report re: Oracle International Corporation; dated Oct. 30, 2024.

* cited by examiner users logged in to host using 'mybastion' — 550

From Date

To Date

Services 530

Services(100) using ZTB

Services(9) without ZTB

Services(50) with max ZTB connections

ZTB users(20)

Access 540

Failed login attempts(3)

Successful logins(5)

Unauthorized access attempts(2)

| User ID | User CID | Operation | Status | Timestamp | Source IP | Bastion |
|---|---|---|---|---|---|---|
| abc | cid.user...aaaa | Connection | Success | 2024-04-04T15:15:59.507Z | 10.0.0.2 | mybastion |
| xyz | cid.user...adsdd | Connection | Failed | 2024-04-04T15:16:01.100Z | 10.0.0.5 | mybastion |

560

*FIG. 5B*

SYSTEM AND METHOD FOR RISK AND USAGE SCORING OF COMMANDS ACROSS SSH SESSIONS

TECHNICAL FIELD

This disclosure generally relates to network security, and more specifically to monitoring command security in a cloud computing environment.

BACKGROUND

Secure shell (SSH) is a mechanism used by operators to access cloud resources (host) to perform various production or development activities that are intentional for the safety of cloud infrastructure. An operator accesses production computing resources using SSH for numerous reasons such as regions being built where operators need to the check configuration status on the host, the agent configuration, the host backend health status, etc.

BRIEF DESCRIPTION OF THE DRAWINGS

FIGS. 5A-5B illustrate an activity tracking, according to at least one embodiment.

DESCRIPTION OF EXAMPLE EMBODIMENTS

Overview

Figure 1:
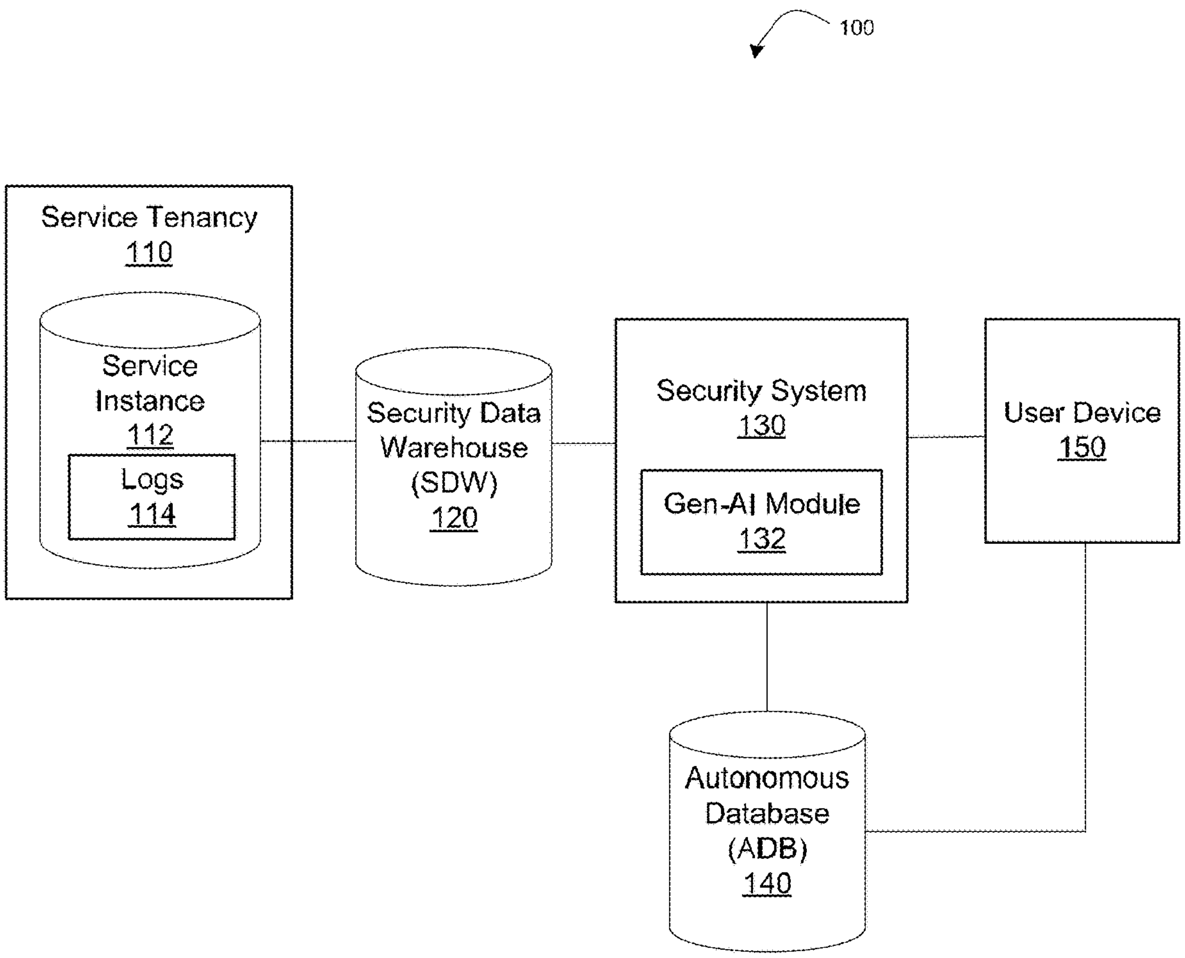
FIG. 1 illustrates a system architecture for risk assessment of SSH commands, according to at least one embodiment.

According to an embodiment, one or more computer-readable non-transitory storage media may embody software executable for the following operations. The operations may include identifying a first log indicating executions of a plurality of commands associated with a first SSH session. A first user may access a first instance through the first SSH session. The operations may also include identifying a generic prompt that specifies a generic set of one or more commands of interest. The operations may additionally include identifying a first customized prompt that specifies a first customized set of one or more commands of interest, the first customized set of commands of interest being specific to an attribute associated with one or more of the first user, the first instance, or the first SSH session. The operations may then include inputting the generic prompt, the first customized prompt, and the first log to a generative AI model. The operations may further include generating, using the generative AI model, a risk assessment for the first SSH session based at least on one or more executions of the generic set of commands of interest and one or more executions of the first customized set of commands of interest from the executions of the plurality of commands in the first log.

In certain embodiments, the first customized prompt may further specify a scoring configuration for determining a command risk score for a command of the first customized set of commands of interest. Accordingly, generating the risk assessment for the first SSH session may comprise determining the command risk score based on the scoring configuration specified by the first customized prompt.

In certain embodiments, the operations may further include determining an impact level associated with the command of the first customized set of commands of interest based on one or more of a type associated with the command, a function associated with the command, or a context associated with a usage of the command. The scoring configuration may comprise the impact level associated with the command. Accordingly, the command risk score may be determined further based on the impact level associated with the command.

In certain embodiments, the risk assessment for the first SSH session may comprise one or more of (1) a summary of the executions of the generic set of commands of interest and the executions of the first customized set of commands of interest in the first log, or (2) a session risk score determined based on the executions of the generic set of commands of interest and the executions of the first customized set of commands of interest in the first log, or (3) a count of the executions of the generic set of commands of interest and the executions of the first customized set of commands of interest in the first log.

In certain embodiments, the first customized prompt may further specify a safe command, and the safe command is same as one of the generic set of commands of interest, and wherein the risk assessment for the first SSH session does not indicate an increased risk due to executions of the safe command.

In certain embodiments, the generic prompt may be configured to instruct the generative AI model to determine a first category for a first command of the generic set of commands of interest among a plurality of categories and determine a first category risk score for the first category. Accordingly, the operations may further include determining, using the generative AI model, a second category associated with a second command of the first customized set of commands of interest, and determining, using the generative AI model, a second category risk score for the second category.

In certain embodiments, the generic prompt may be further configured to instruct the generative AI model to generate the risk assessment for the first SSH session based on a first category risk score associated with the first command. Accordingly, the operations may further include generating, using the generative AI model, one or more of a summary of the second category or a session risk score of the first SSH session determined based on the second category risk score.

In certain embodiments, the first customized prompt may further specify a scoring configuration for determining a command risk score for a command of the first customized set of commands of interest. The scoring configuration may comprise a category weight associated with the second category. Accordingly, the operations may further include determining a second command risk score for the second command based on the category weight associated with the second category.

In certain embodiments, the operations may further include responsive to determining that the risk assessment for the first SSH session exceeds one or more criteria, blocking execution of a command of interest in a future SSH session where the first user accesses the first instance.

In certain embodiments, the operations may further include accessing one or more video recordings associated with the first SSH session. The operations may also include parsing the one or more video recordings to generate the first log. The operations may additionally include extracting timeseries data from the first SSH session. The operations may then include generating activity tracking the first customized set of commands of interest based on the timeseries data.

In certain embodiments, the generic prompt may be reusable for risk assessments for different SSH sessions without modifications. The operations may further include identifying a second log indicating executions of a plurality of commands associated with a second secure shell (SSH) session, wherein a second user accesses a second instance via the second SSH session. The operations may also include identifying a second customized prompt that specifies a second customized set of one or more commands of interest, the second customized set of commands of interest being specific to one or more of the second user, the second instance, or the second SSH session. The operations may then include inputting the generic prompt, the second customized prompt, and the second log to the generative AI model. The operations may further include generating, using the generative AI model, a risk assessment for the second SSH session based at least on one or more executions of the generic set of commands of interest and one or more executions of the second customized set of commands of interest from the executions of the plurality of commands in the second log.

In certain embodiments, the operations may further include identifying a plurality of logs associated with a plurality of SSH sessions, wherein each of the logs indicates executions of a plurality of commands, and wherein the plurality of SSH sessions are associated with a plurality of tenancies. For each of the plurality of tenancies, the operations may include extracting commands associated with that tenancy and identifying a customized prompt that specifies a customized set of one or more commands of interest. The customized set of commands of interest may be specific to that tenancy. For each of the plurality of tenancies, the operations may also include inputting the generic prompt, the customized prompt, and the extracted commands to the generative AI model, identifying, using the generative AI model, the second command of interest from the extracted commands, and generating, using the generative AI model, a risk assessment for that tenancy based at least on one or more executions of the generic set of commands of interest and one or more executions of the extracted commands. The operations may further include visually presenting the plurality of risk assessments associated with the plurality of tenancies via a user interface.

In certain embodiments, the operations may further include based at least on the risk assessment for the first SSH session, identifying one or more candidate commands from the plurality of commands for tooling. The operations may then include generating a recommendation comprising the one or more candidate commands for tooling.

In certain embodiments, identifying the one or more candidate commands may be further based on executions of commands associated with the first user.

In certain embodiments, the first SSH session may be associated with a first tenancy. Accordingly, identifying the one or more candidate commands may be further based on executions of commands associated with the first tenancy.

In certain embodiments, the operations may further include blocking execution of the one or more candidate commands in a future SSH session in response to detecting one or more of the candidate command, the future SSH session being associated with the first user, the future SSH session being associated with a tenancy associated with the first user, or the future SSH session being associated with an instance accessed by the first SSH session.

In certain embodiments, the operations may further include based on the recommendation, automatically generating tooling for the one or more candidate commands. The generated tooling for a first candidate command of the one or more candidate commands may comprise software that performs a same functionality as the first candidate command.

In certain embodiments, automatically generating the tooling for the one or more of the candidate commands may comprise providing an auto-tooling prompt to a generative artificial-intelligence (AI) model.

In certain embodiments, the auto-tooling prompt may be configured to instruct the generative AI model to build an application that has functionalities corresponding to the one or more candidate commands. The application may be programmed to require a user to log into the application using identity and access management (IAM) credentials.

In certain embodiments, the auto-tooling prompt may be configured to instruct the generative AI model to build an application that has functionalities corresponding to the one or more candidate commands. The application may be programmed to emit audit logs.

According to another embodiment, a system may include one or more processors and a non-transitory memory coupled to the processors comprising instructions, when executed by the one or more processors, cause the one or more processors to execute the following operations. The operations may include identifying a first log indicating executions of a plurality of commands associated with a first secure shell (SSH) session. A first user may access a first instance through the first SSH session. The operations may also include identifying a generic prompt that specifies a generic set of one or more commands of interest. The operations may additionally include identifying a first customized prompt that specifies a first customized set of one or more commands of interest, the first customized set of commands of interest being specific to an attribute associated with one or more of the first user, the first instance, or the first SSH session. The operations may then include inputting the generic prompt, the first customized prompt, and the first log to a generative AI model. The operations may further include generating, using the generative AI model, a risk assessment for the first SSH session based at least on one or more executions of the generic set of commands of interest and one or more executions of the first customized set of commands of interest from the executions of the plurality of commands in the first log.

According to another embodiment, a method may include the following operations. The operations may include identifying a first log indicating executions of a plurality of commands associated with a first secure shell (SSH) session. A first user may access a first instance through the first SSH session. The operations may also include identifying a generic prompt that specifies a generic set of one or more commands of interest. The operations may additionally include identifying a first customized prompt that specifies a first customized set of one or more commands of interest, the first customized set of commands of interest being specific to an attribute associated with one or more of the first user, the first instance, or the first SSH session. The operations may then include inputting the generic prompt, the first customized prompt, and the first log to a generative AI model. The operations may further include generating, using the generative AI model, a risk assessment for the first SSH session based at least on one or more executions of the generic set of commands of interest and one or more executions of the first customized set of commands of interest from the executions of the plurality of commands in the first log.

Technical advantages of certain embodiments of this disclosure may include one or more of the following. The disclosed systems and methods can improve security by monitoring frequent SSH commands run by operators in the cloud infrastructure, determining risk scores of these commands, and determining whether the usage of risky commands has been reduced or if alternatives can be suggested. The disclosed system and method provide personalized automatic tooling, which increases efficiency and reduces manual errors. For example, automatic tooling can enhance user productivity by identifying repetitive patterns in commands of SSH sessions and generating automation scripts. As another example, automatic tooling can help users streamline their workflows, reduce manual effort, and/or improve efficiency. For instance, automatic tooling may increase efficiency by automating repetitive tasks, allowing users to focus on more complex issues. Another technical advantage may include reduced manual errors. By automating commonly used command sequences, the potential for human error may be minimized. Another technical advantage may include personalization as tooling suggestions can be tailored to individual users based on their command usage patterns, providing relevant automation options.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

The commands run by operators on a host can be saved by the operating system into history files that may be used to find frequent or common commands run by operators. As such, a cloud infrastructure can improve its tooling infrastructure and security and compliance posture as it leans toward reduction in SSH usage. The shell history data may be collected by the cloud infrastructure's workload protection (WLP) service and ingested into a security data warehouse (SDW).

However, a few technical challenges exist in association with the SSH usage. One technical challenge can relate to security monitoring, compliance, activity tracking, policy monitoring and forensic analysis of the SSH usage. For example, SSH can be used for many reasons, yet may not be monitored. As another example, it can be difficult for an administrator to track which tenancy, service, and/or operator performed which operations. Another technical challenge may be that operators use SSH on a production host to run commands, which may be risky or may be run without the knowledge of the impact. For example, cloud scale or dependent services may be impacted.

SSH session data may be available at various sources such as SSH session recording videos in overlay, SSH shell history, audited parsed transparency logs, etc. When amalgamated together, these sources can produce meaningful information for an administrator to track access and activity of an operator, search events of interest, and perform forensic analysis, for security intel team to identity lateral movements in cloud, and for tooling team to identify frequent commands run by operators so that they can build better audited and identity and access management (IAM) based tooling infrastructure for service teams. Therefore, the embodiments disclosed herein may solve the aforementioned technical challenges by monitoring the frequent commands run by operators in the cloud infrastructure over time by generating reports to determine whether the usage of the commands has been reduced or if an available alternate can be suggested. If an available alternate cannot be suggested, particular embodiments may automatically build these tools or provide data to the cloud infrastructure's tooling team to build these tools in an effort to reduce SSH usage.

In particular embodiments, a security system may write jobs in a shared data warehouse (SDW) to generate reports and upload them to an autonomous data warehouse (ADW) for a dashboard integration. The security system may use generative AI to evaluate the risk score of the command run by an operator, provide a scorecard report on the dashboard that displays the list of all tenancies, their risks and usage scores, provide a scorecard report on the dashboard that displays top frequent commands (e.g., top 20) run and the usage scores for each tenancy. The security system may further provide a summary report of the top commands (e.g., top 20) run over a predetermined period of time (e.g., a month), where the command usage is not reduced, so that the security system or cloud infrastructure's tooling team can build these tools for safer operations. Additionally, the security system may provide runbook on alternate mechanism instead of using SSH.

FIG. 1 illustrates a system architecture 100 for risk assessment of SSH commands, according to at least one embodiment. In particular embodiments, the SSH sessions may be associated with the cloud infrastructure. System architecture 100 may include a service tenancy 110, a security data warehouse (SDW) 120, a security system 130, an autonomous database (ADB) 140, and a user device 150. It should be noted that although this disclosure describes one service tenancy 110, one security data warehouse 120, one security system 130, one autonomous database 140, and one user device 150 in FIG. 1, any suitable number (e.g., more than one) of service tenancies, data stores, security data warehouses, security systems, autonomous databases, and user devices can be implemented for risk assessment of SSH sessions.

Service tenancy 110 may be provisioned to users for them to access computing resources of the cloud infrastructure. Service tenancy 110 may include a service instance 112 which collects logs 114 generated from SSH sessions. Although this disclosure describes one service instance 112, this disclosure contemplates any suitable number (e.g., more than one) of service instances 112 within service tenancy 110. As described above, system architecture 100 has a multi-tenancy design with isolation, customization, and user-level settings. Users within each tenancy may operate within an isolated environment, ensuring that configurations, user access levels, and security policies are specific to that tenancy. Examples of operations for generating SSH logs are described herein with reference to FIG. 2.

Security data warehouse 120 may ingest logs 114 from service instance 112 of service tenancy 110. Security system 130 may execute a generative AI module 132 to analyze the ingested logs 114 in security data warehouse 120 to perform risk assessment of SSH commands. Security system 130 may firstly conduct command analysis by monitoring and logging commands executed in SSH sessions. Security system 130 may then conduct risk categorization, in which commands are compared against the risky commands list and categorized. Security system 130 may further determine risk scoring. In particular embodiments, the scoring mechanism may be that each risky command contributes to the risk score based on its impact level and category weight. The total risk scores may be normalized to a scale of 0 to 100. Security system 130 may further generate a concise summary, highlighting detected risks and affected categories. In particular embodiments, security system 130 may additionally execute the generative AI module 132 to generate tooling based on the risk assessment. Examples of operations for risk assessment of SSH commands and automatic tooling are described herein with reference to FIG. 2.

ADB 140 may store the risk assessment and generated tooling from security system 130.

User device 150 can access the risk assessment and automatic tooling from ADB 140. In some embodiments, security system 130 may directly provide the risk assessment and generated tooling to user device 150. Examples of operations for providing risk assessment of SSH commands is described herein with reference to FIG. 2 and FIGS. 3A-3C.

Figure 2:
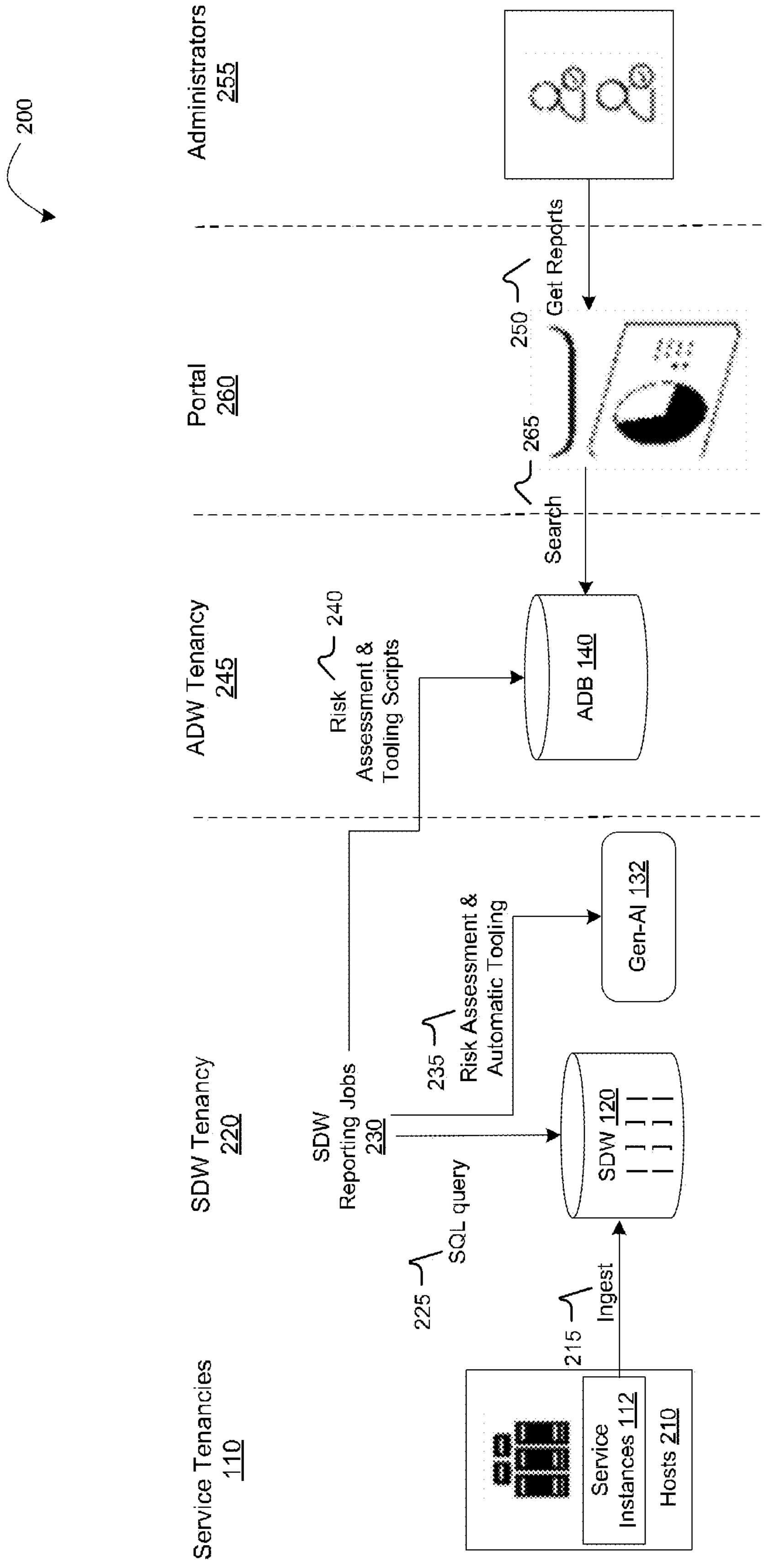
FIG. 2 illustrates an operational flow for risk assessment of SSH commands, according to at least one embodiment.

FIG. 2 illustrates an operational flow 200 for risk assessment of SSH commands, according to at least one embodiment.

To begin with, the shell history may be collected at a certain time interval (e.g., every hour) from service instances 112 running on the hosts 210 of the cloud infrastructure. In particular embodiments, service instances 112 may be in service tenancies 110 as described with reference to FIG. 1. Service instances 112 may be in substrate or overlay. For example, service instance 112 may be WLP and the collected logs 114 may include WLP shell history. As another example, service instance 112 may be a security information and event management (SIEM) system and the collected logs 114 may include audited parsed transparency logs.

In particular embodiments, the shell history data may include SSH session recording videos. Security system 130 may parse SSH session recording videos into meaningful logs 114 that have access related information about user authentication and access mechanisms. Such information may include authentication details such fingerprints, access attempts, failed attempts, unauthorized access, etc. Logs 114 may additionally include activity related information such as commands run during an SSH session with a precise timestamp of when a command was run. The parsing of logs can reduce the effort of watching a lengthy session video while logs 114 allow easy searching for interested events.

At operation 215, logs 114 may be ingested to security data warehouse (SDW) 120. SDW 120 may be within an SDW tenancy 220. In particular embodiments, logs 114 may be ingested into SDW 120 only if there is a modification in the history file from the last collected timestamp.

At operation 225, SDW reporting jobs 230 may generate reports by using Structured query language (SQL) query on SDW 120. In particular embodiments, the jobs may be run once daily.

At operation 235, gen-AI module 132 of security system 130 may perform risk assessment and/or automatic tooling. In particular embodiments, one type of risk assessment may include identifying risky commands and another type of risk assessments may include minimizing SSH usage. To assess risky commands so that administrators could confidently evaluate the activity of SSH sessions carried out by operators without having to keep track of the risky commands that were run, security system 130 may calculate the risk scores using generative AI. Furthermore, security system 130 may analyze the use of SSH in a time period (e.g., week by week) by identifying the commands that are frequently used. The usage report may provide a clear indication of the commands that are commonly used, allowing security system 130 or the cloud infrastructure tooling team to further analyze and build an alternative approach for minimizing the use of SSH in the cloud infrastructure.

In particular embodiments, security system 130 may determine risk scores for SSH commands by providing gen-AI module 132 with the list of all commands run for each tenancy, a generic prompt, and/or a customized prompt. The generic prompt may specify a generic set of commands of interest. The customized prompt may specify a customized set of commands of interest specific to an attribute associated with a user, an instance accessed by a SSH session, or the SSH session.

Figure 3:
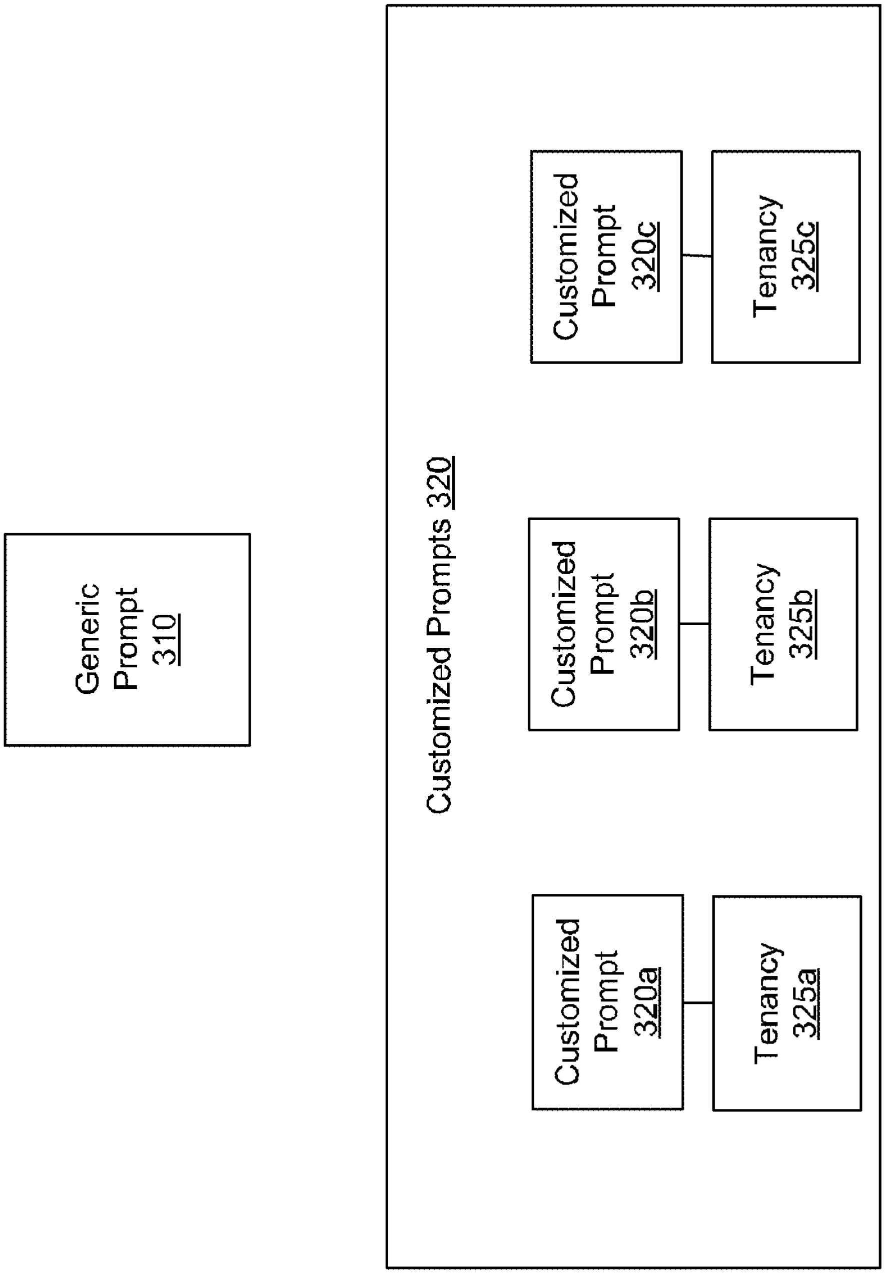
FIG. 3 illustrates generic prompt and customized prompts for risk assessment of SSH commands, according to at least one embodiment.

FIG. 3 illustrates generic prompt and customized prompts for risk assessment of SSH commands, according to at least one embodiment. As illustrated in FIG. 3, security system 130 may access a generic prompt 310 and a pool of customized prompts 320 for risk assessment of SSH commands. Each customized prompt is related to a different tenancy. For example, customized prompt **320*a* is related to tenancy 325*a* (e.g., Tenancy A); customized prompt 320*b* is related to tenancy 325*b* (e.g., Tenancy B); customized prompt 320*c* is related to tenancy 325*c* (e.g., Tenancy C). For analyzing a log for tenancy 325*a*, the generic prompt 310 and customized prompt 320*a* are used. For analyzing a log for tenancy 325*b*, the generic prompt 310 and customized prompt 320*b* are used. For analyzing a log for tenancy 325*c*, the generic prompt 310 and customized prompt 320*c* are used. It should be noted that although this disclosure describes one generic prompt and three customized prompts in FIG. 3**, any suitable number (e.g., more than one) of generic prompt and any suitable number (e.g., more than three) of customized prompt can be generated for risk assessment of SSH commands.

In certain embodiments, security system 130 may provide gen-AI module 132 configurations of risky commands (i.e., commands considered risky) and/or safe commands (i.e., commands deemed safe). Security system 130 may also provide gen-AI module 132 configurations of impact levels and/or assigned scores of commands as listed in Table 1 below.

TABLE 1

Command impact level and assigned scores.

| Impact Level | Description | Score Range |
|---|---|---|
| Low | Minor effects (e.g., simple read/write) | 5-10 |
| Moderate | Could modify configurations or transfer small data | 11-30 |
| High | Changes critical files, network scans, transfers significant data | 31-50 |
| Critical | Enables privilege escalation, installs packages, conducts thorough reconnaissance | 51-70 |

In particular embodiments, security system 130 may determine the impact level for each command based on command type, command effect and/or command context.

Low-impact commands may include commands such as those that provide basic read access without modifying system state. Moderate-impact commands may include commands that involve small data transfers or configuration changes. High-impact commands may include commands that change critical system files or perform network scans. Critical-impact commands may include commands involving privilege escalation, implementing deep system changes or installing packages. Command context may indicate the context in which the command is used, such as modifying sensitive files or scanning network interfaces.

In some embodiments, security system 130 may provide gen-AI 132 with category weights (i.e., weights assigned to different risk categories) and/or tooling suggestion rules (i.e., criteria for when to suggest automation scripts).

In particular embodiments, users or tenancies can define their own risky commands, safe commands, and/or category weights, to tailor the risk assessment to their operational needs. Within each tenancy, user-specific configurations can allow for granular control over risk assessment and tooling suggestions. For example, the configuration of risky and safe commands, impact levels, category weights, and tooling suggestion rules can be either user specific or tenancy specific.

Below is an example configuration for tenancy A.

{
“tenancy_ocid”: “tenancy_a”,
“risky_commands”: [“sudo”, “rm -rf”, “nmap”, “wget”, “curl”, “ssh-keygen”],
“safe_commands”: [“ls”, “cat”, “cd”, “echo”],
“category_weights”: {
“file_modifications”: 1.5,
“network_scanning”: 2.0,
“privilege_escalation”: 2.5,
“data_exfiltration”: 2.0,
“system_configuration_changes”: 1.8,
“denial_of_service”: 2.2
},
“impact_scores”: {
“low”: 10,
“moderate”: 30,
“high”: 50,
“critical”: 70
},
“tooling_suggestion_rules”: {
“min_frequency”: 5,
“time_window_hours”: 48
}
}
Below is an example configuration for tenancy B.
{
“tenancy_ocid”: “tenancy_b”,
“risky_commands”: [“sudo”, “chmod”, “chown”, “scp”, “ftp”],
“safe_commands”: [“pwd”, “mkdir”, “touch”, “grep”],
“category_weights”: {
“file_modifications”: 1.2,
“network_scanning”: 1.0,
“privilege_escalation”: 2.0,
“data_exfiltration”: 3.0,
“system_configuration_changes”: 1.5,
“denial_of_service”: 2.5
},
“impact_scores”: {
“low”: 5,
“moderate”: 20,
“high”: 40,
“critical”: 60
},
“tooling_suggestion_rules”: {
“min_frequency”: 3,
“time_window_hours”: 24
}
}

Below is an example configuration for a specific user (user X) in tenancy A.

{
“user_ocid”: “user_x”,
“tenancy_ocid”: “tenancy_a”,
“additional_risky_commands”: [“vi /etc/passwd”, “iptables”],
“safe_commands”: [“nano”, “less”],
“category_weights_overrides”: {
“privilege_escalation”: 3.0
}
}
Below is an example configuration for a specific user (user Y) in tenancy B.
{
“user_ocid”: “user_y”,
“ocid_ocid”: “tenancy_b”,
“additional_risky_commands”: [“docker exec”, “kubectl delete”],
“safe_commands”: [“kubectl get”, “docker ps”],
“category_weights_overrides”: {
“file_modifications”: 1.0
}
}

In certain embodiments, security system 130 may provide gen-AI module 132 with a task instruction. In particular embodiments, the task instruction may be a simple English text that classifies commands into high-level categories and then returns the risk score and risk justification for the command run. For example, the task instruction may be: “You are an SSH expert that reads through the list of SSH session and summarizes the commands run within a session and place them into categories privilege escalation, exfiltration, destroyer, sensitive, read. Answer in a short and concise way without mentioning the actual SSH commands in about 150 words. Also, assign a risk score of 1-10 based on the commands that were run. I want you to return a JSON response in three sections: category, summary, risk score, and risk justification.” The task instruction may be enhanced to obtain detailed results, including the summary of all commands run. Gen-AI module 132 may use one or more inputs as prompts to generate the risk assessment including risk scores and command usage.

Below is an example prompt provided to gen-AI module 132 for risk assessment: “Analyze the provided SSH session commands (Input Commands in JSON format) and generate a comprehensive risk assessment report with a focus on stability and consistency. Follow these steps to calculate the risk score:

Step 1: Identify Risky Commands

Use the General Risky Commands list (e.g., sudo, nmap, vim, wget, ssh-keygen). Identify any Additional Risky Commands and Safe commands specified in the JSON configuration. For each risky command, consider its arguments and options (e.g., -rf, -sP) to assess its intent (file modification, network scanning, etc.).

Step 2: Categorize Risks

For each command, classify risks into these categories:

File system modifications: Actions like chmod, chown, rm, mv that modify permissions or delete files.

Network scanning/reconnaissance: Commands like nmap, ping that scan or probe networks.

Privilege escalation: Actions like sudo, su that elevate permissions.

Data exfiltration/leakage: Commands like scp, curl, wget that can transfer data outside the system.

System configuration changes: Commands that alter system settings (e.g., vim on /etc/passwd).

Potential denial-of-service (DoS) attacks: Commands that could overwhelm resources (e.g., fork bombs, heavy loops).

Step 3: Assign Risk Scores to Each Category

Assign a score to each risk category using the following weighting system:

Low impact: Commands that have minor effects (e.g., simple read/write operations).

Score: 5-10

Moderate impact: Commands that could modify configurations or transfer small amounts of data.

Score: 11-30

High impact: Commands that change critical files, scan the network, or transfer significant data.

Score: 31-50

Critical impact: Commands that enable privilege escalation, install packages, or conduct thorough reconnaissance.

Score: 51-70

Step 4: Calculate the Final Risk Score

Sum the scores for each category and normalize the score to a range between 0 and 100.

Use this formula:

Risk Score=(sum of individual category scores/maximum possible score)*100

Maximum possible score is calculated based on all identified categories.

Step 5: Provide the Final Output in JSON

Return the output in the following JSON format:

```
{
"Summary": "[brief summary of detected risks, listing affected categories]",
"Risk Score": [score]
}
```

Scoring Tiers:

0-30: Low risk (minimal or no suspicious activity detected).

31-50: Moderate risk (some risky commands, but manageable).

51-70: High risk (multiple risky commands with potential exploitation).

71-100: Critical risk (commands suggest potential for system compromise).

Tenancy and user level configuration:

<json_configuration>

Input Commands:

<ssh_session_commands>

In particular embodiments, the risk score may be calculated across multiple (e.g., all) commands run in one or more (e.g., all) tenancies. As an example and not by way of limitation, the following steps may be used to calculate the risk score across the top 20 risky commands run for a tenancy. Security system 130 can sum the individual risk score and then divide the sum by the total number of risky commands, e.g., a number no greater than 20.

The shell history collected from one or more hosts may be daily monitored to generate a tenancy scorecard that identifies risky commands. The scorecard for a tenancy may indicate how a service team leverages the usage of SSH even if there are audited alternates and/or to be developed tools for safer cloud operations. For example, the scorecard may include a summary of the commands, detailed risk scores of the commands, and/or identified command vulnerability so that security teams can apply policies on computing resources to stop the usage of these commands. An aggregated scorecard for each tenancy can be generated by adding the total scores of the top (e.g., 20) frequently used commands in the tenancy report. The scorecard may list the risk scores in descending order, where a greater number indicates more risk of the command to be run on a production host.

In usage reporting, security system 130 may identify frequent commands run by an operator by scrubbing and grouping commands together and identifying risky commands using risk scores generated by gen-AI module 132. In particular embodiments, frequent commands can be grouped together to obtain the list of top (e.g., 20) commands and its daily count. However, the grouping results may return unique commands as some commands may have custom names such as "HSM/*" in command "sudo rm-rf HSM/*" or "/var/config/*" in sudo rm-rf/var/config/*. To maintain data integrity, the command string may be split, and the first, second and/or third commands may be grouped together to get the grouped count.

Security system 130 may alert security teams for potential breach so that policies can be applied to maintain security posture of the cloud infrastructure. In an example, the SSH usage tracking report may be a week-by-week report spanning up to five weeks. The report may list the top 20 commands that are tracked each week. The report may display the percentage change from the previous week each week, with a decrease in percentage showing a negative difference and an increase in percentage with a positive difference. The purpose of the usage report for a tenancy may be to find the percentage utilization over time to evaluate the reduction in usage week-by-week.

As an example and not by way of limitation, the following steps can be used to calculate the total percentage change across all commands. Security system 130 may first calculate the individual percentage change from the previous week, then sum the individual percentages, and further divide the sum by the total number of commands, e.g., a number no greater than 20.

For percentage change that remains constant or near constant or an increase, security system may determine any existing alternates or an action item to build new tools for minimizing SSH access. In some embodiments, the cloud infrastructure tooling team may be notified for providing any existing alternates or an action item to build new tools for minimizing SSH access.

Automatic tooling can enhance user productivity by identifying repetitive patterns in commands of SSH sessions and generating automation scripts. Automatic tooling can help users streamline their workflows, reduce manual effort, and improve efficiency. In particular embodiments, security system 130 may build automatic tooling using large language models (LLMs), which generate scripts (e.g., Bash or Python scripts) based on the frequency and context of command usage. In some embodiments, the tooling suggestions may be personalized based on user activities within each tenancy.

Tooling suggestion rules can be configured at both tenancy and user levels, allowing administrators to define specific rules for when to suggest automation. As an example and not by way of limitation, these rules may include minimum frequency and time windows. Minimum frequency defines the number of times a command or command sequence must be detected within a specified timeframe before suggesting automation. For example, if a command is executed at least five times in a 48-hour window, security system 130 will consider generating an automation script. Time window specifies the timeframe in which the frequency count is evaluated. For instance, if a command sequence is repeated multiple times within 24 or 48 hours, security system 130 will identify it as a candidate for automation. The configuration for these rules can vary per tenancy and per user, allowing for personalized and flexible automation.

Below is an example configuration for tooling suggestion rules at the tenancy level:

```
{
"tooling_suggestion_rules": {
"min_frequency": 5,
"time_window_hours": 48
}
}
```

In the above example, min_frequency specifies that a command or sequence must be repeated at least 5 times before suggesting automation. time_window_hours sets the time window to 48 hours for evaluating command frequency.

In particular embodiments, automatic tooling works as follows. Security system 130 may continuously monitor SSH sessions and log the commands executed by users. Frequent command patterns or repetitive tasks may be identified based on the configured frequency and time window. Once a command sequence meets the tooling suggestion rules, security system 130 may prompt the LLM to generate a script. The LLM may use the context of the commands and their arguments to create a suitable Bash or Python script that replicates the sequence. In particular embodiments, the generated tooling for a command may include software/application that performs the same functionality as the command. The software/application may be programmed to require a user to log into the application using identity and access management (IAM) credentials or to emit audit logs.

Referring back to FIG. 2, at operation 240, the risk assessment (e.g., risk scores and top risky commands) and generated scripts for tooling may be persisted daily to ADB 140. ADB 140 may be within an autonomous data warehouse (ADW) tenancy 245.

At operation 250, at any given time administrators 255 can view the risk assessment and generated tooling to check command execution scorecard on a portal 260 via their user devices 150. The risk assessment and generated tooling may be displayed on a dashboard of the portal 260. The dashboard may show the risk scores and usage of the commands run by operators in their tenancies. For example, the dashboard may show the following: the top 20 risky commands run and their individual risk scores; week-by-week usage report of the top 20 commands, the percentage usage that increased or decreased; and top 50 commands run.

In certain embodiments, the generated scripts are presented on the dashboard as suggested tooling. The suggested tooling may be helpful in providing an overview to different users, e.g., the cloud infrastructure tooling team. For example, the suggested tooling may show the top (e.g., 20) commands across tenancies along with their usage on a weekly basis. Users have the option to review the generated script and its intended purpose, modify the script if necessary to suit specific requirements, save and implement the script for future use, or dismiss the suggestion if it is not needed.

Below is an example of automatic tooling suggestion. Consider user Y from tenancy B, who frequently performs the following commands:

```
docker ps
docker exec it container_id bash
cd/var/www/html
vi index.html
exit.
```

The automatic tooling process may include pattern detection where security system 130 detects that this set of commands has been executed multiple times over a defined timeframe (e.g., 24 hours) and script generation where the LLM generates a Bash script to automate the process. The Bash script may be as follows:

```
#!/bin/bash
# Get the container ID of the running web server
CONTAINER_ID=$(docker ps -q -- filter "ancestor=web_server_image")
# Execute commands inside the container
docker exec -it $CONTAINER_ID bash -c "
cd /var/www/html
vi index.html
"
```

In some embodiments, automatic tooling may include blocking certain SSH commands from being executed at the command level, session level, instance level, user level, and/or tenancy level. For example, security system 130 may block execution of a risky command in a future SSH session where a particular user accesses a particular instance responsive to determining that the risk assessment of a SSH session exceeds one or more criteria. As another example, security system 130 may block execution of a risky command in a future SSH session in response to detecting the command, a particular user engaging with the future SSH session, the future SSH session within a particular tenancy, or the future SSH session accessing a particular instance.

Referring back to FIG. 2, at operation 265, the portal 260 may query ADB 140 to generate reports that include command usage, risk scores of commands, and tooling, responsive to the administrator's request to view the report.

In particular embodiments, some data collected may be helpful for internal administrators of the cloud infrastructure but cannot be exposed to external users. As such, all sensitive or private data for external users may be masked in reporting.

Figure 4A:
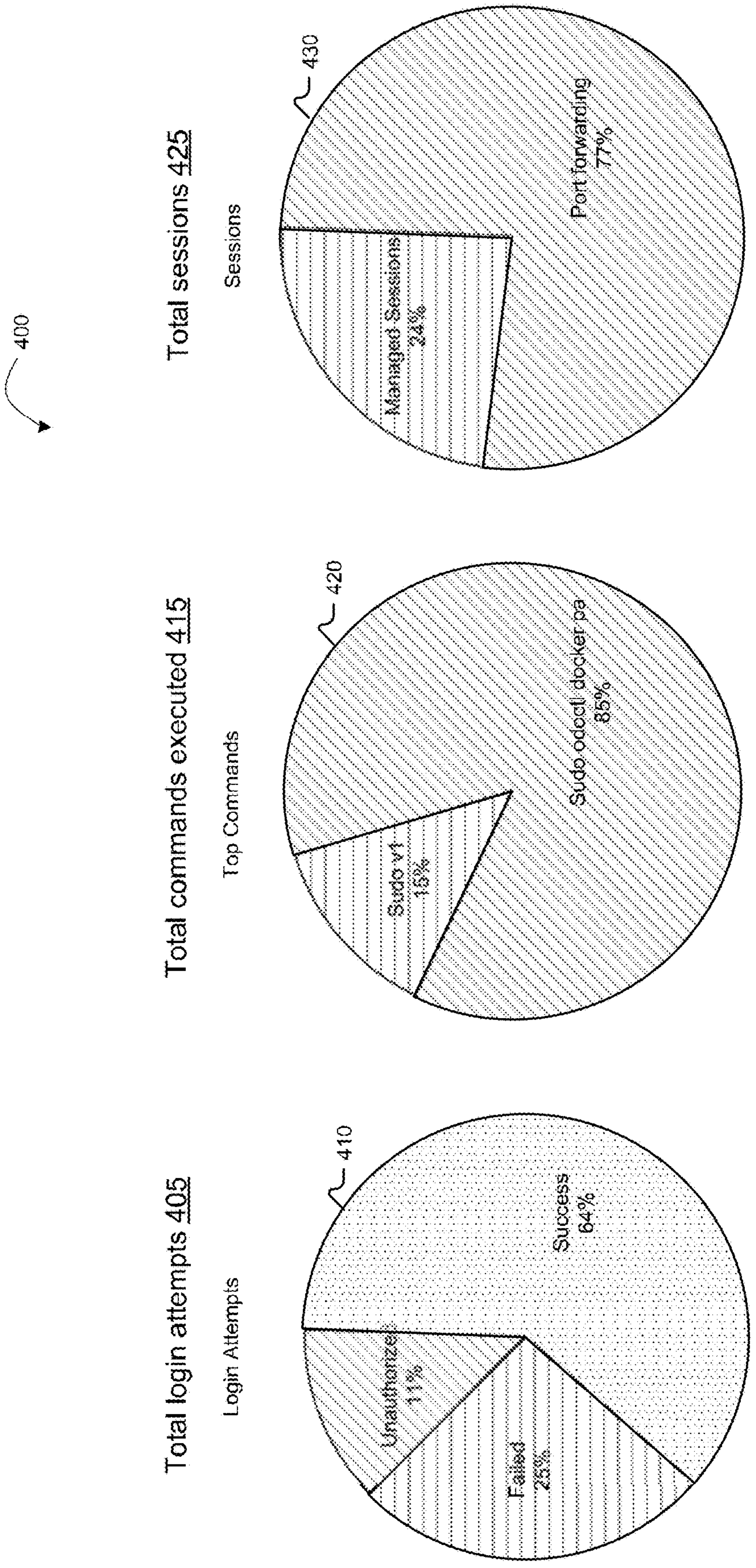
FIGS. 4A-4C illustrate a dashboard, according to at least one embodiment.
Figure 4B:
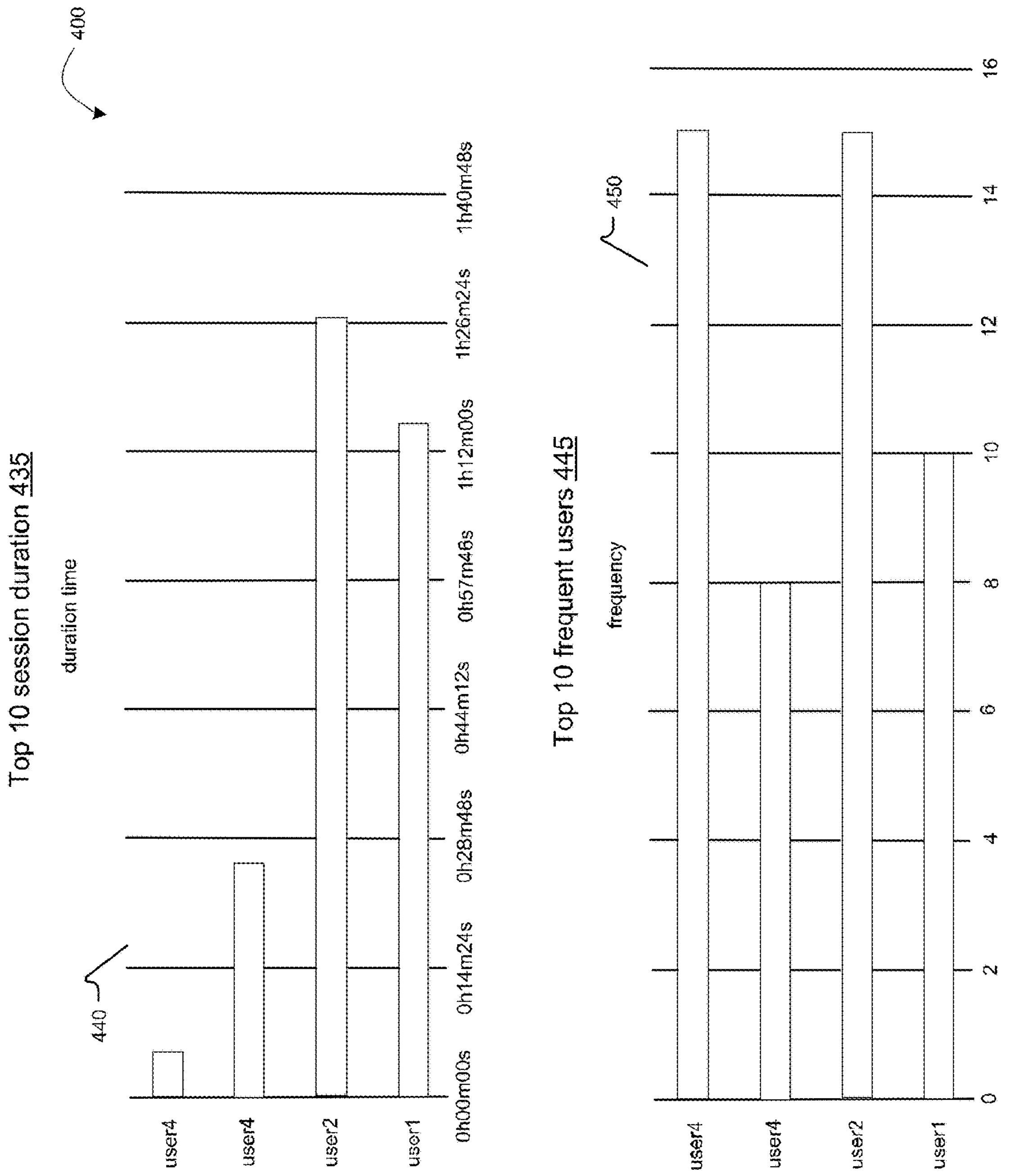
Figure 4C:
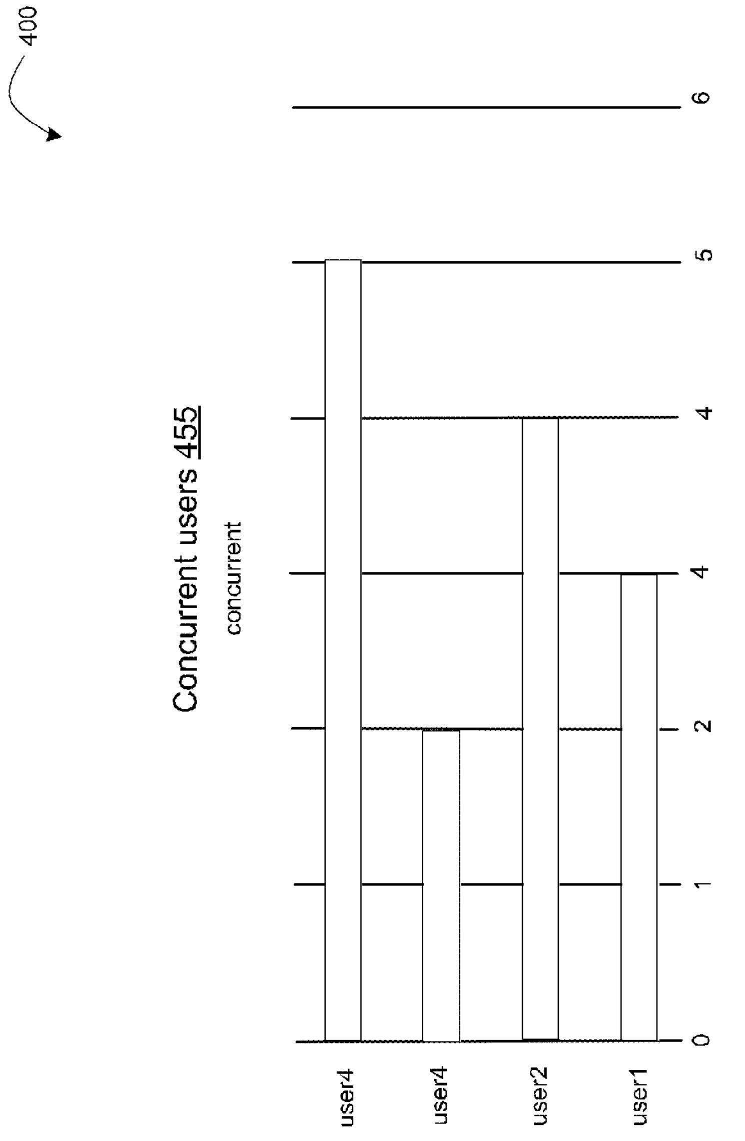

FIGS. 4A-4C illustrate a dashboard 400, according to at least one embodiment. The SSH insights dashboard 400 may give an overview of the SSH connections to determine if a granular search required to be performed on SSH logs. As illustrated in FIG. 4A, the dashboard 400 shows total login attempts 405, total commands executed 415, and total sessions 425. These counts may be associated with any suitable period, e.g., today. The total login attempts 405 may be illustrated as a pie chart 410, showing different percentages of login attempts, e.g., success 64%, failed 25%, and unauthorized 11%. The total commands executed 415 may be illustrated as a pie chart 420, showing different percentages of top commands, e.g., sudo odoctl docker pa 85% and sudo v1 15%. The total sessions 425 may be illustrated as a pie chart 430, showing different percentages of sessions, e.g., port forwarding 77% and managed sessions 23%.

As illustrated in FIG. 4B, the dashboard 400 shows the top 10 session duration 435 and top 10 frequent users 445, which can be associated with any suitable period, e.g., today. The top 10 session duration 435 may show the duration time 440 for different users, e.g., user1, user2, user3, and user4. The top 10 frequent users 445 may show the frequency 450 for different users, e.g., user1, user2, user3, and user4.

As illustrated in FIG. 4C, the dashboard 400 shows the concurrent users 455, which can be associated with any suitable period, e.g., today. The concurrent users for user1 may be 3, for user2 may be 4, for user3 may be 2, and for user4 may be 5.

Figure 5A:
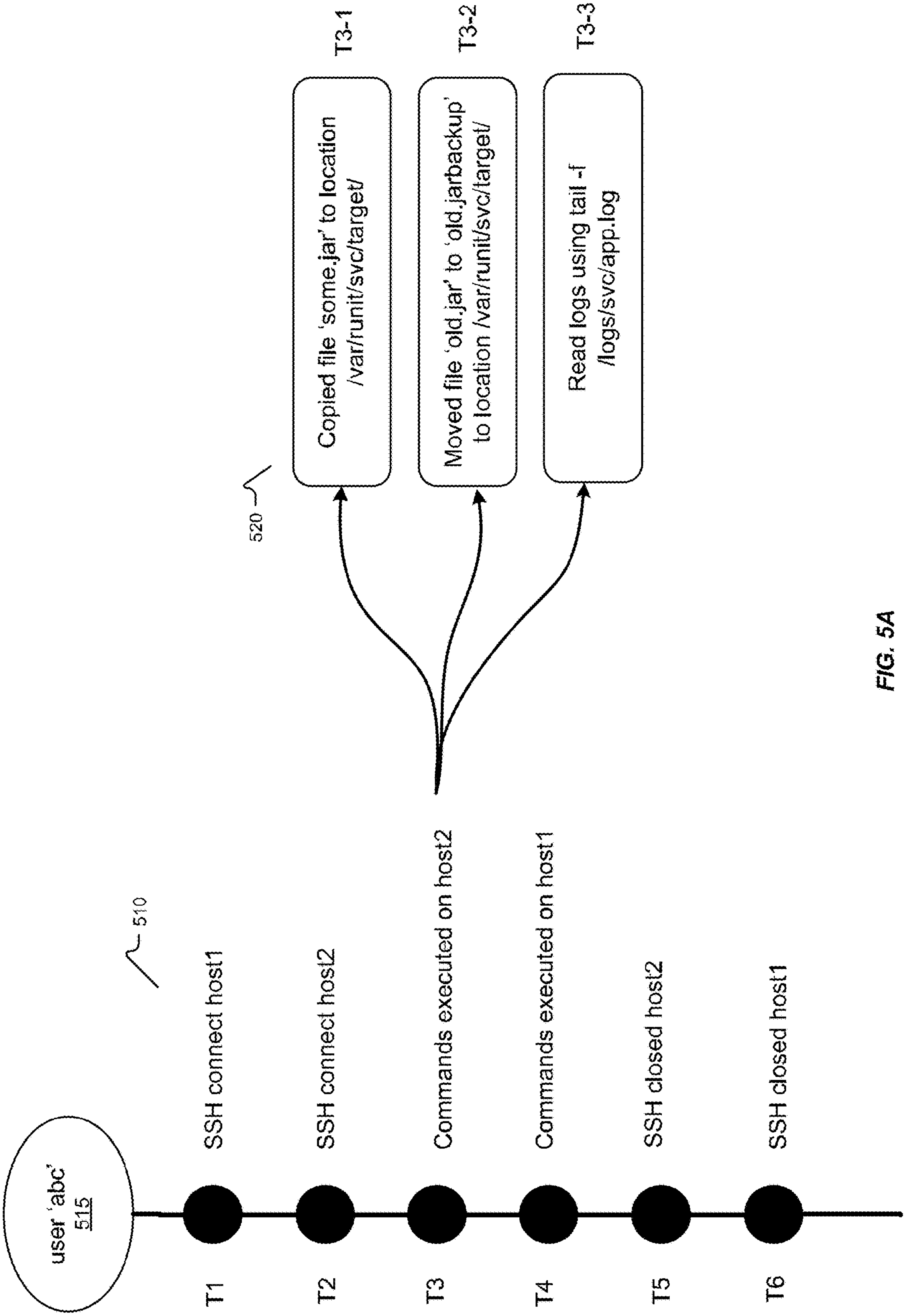

In particular embodiments, security system 130 may allow administrators to track an operator's activity using timeseries data in visual representation or facet search. Security system 130 may parse video records to generate the SSH logs and then extract timeseries data from the generated logs. Security system 130 may also extract SSH logs from generic log formats and then extract timeseries data from the generated logs. FIGS. 5A-5B illustrate an activity tracking, according to at least one embodiment. FIG. 4A shows an activity tracking timeline 510 of a user 515, e.g., user 'abc'. At time T1, user 515 used SSH to connect to host1. At time T2, user 515 used SSH to connect to host2.

At time T3, user 515 executed commands on host2. The executed commands 520 may be also displayed. For example, at time T3-1, user 515 copied file 'some.jar' to location /var/runit/svc/target/; at time T3-2, user 515 moved file 'old.jar' to 'old.jarbackup' to location /var/runit/svc/target/; at time T3-3, user 515 read logs using tail-f/logs/svc/app.log.

At time T4, user 515 executed commands on host1. At time T5, user 515 closed SSH to host2. At time T6, user 515 closed SSH to host1.

FIG. 5B shows a summary of activity tracking based on services 520 and access 530. As illustrated for services 520, 100 services used zero trust bastion (ZTB), 9 services did not use ZTB, 50 services used max ZTB connections, and 20 users used ZTB. As illustrated for access 530, there were 3 failed login attempts, 5 successful logins, and 2 unauthorized access attempts. FIG. 5B additionally shows a search bar 540 where a specific activity can be inputted. For example, the activity may be: "users logged in to host using 'mybastion'." The search results can be filtered by date, e.g., by operating "from date" and "to date". The filtered results are shown in table 550, which include user identifier (ID), user cloud identifier (CID), operation, status, timestamp, source IP, and Bastion.

Figure 6A:
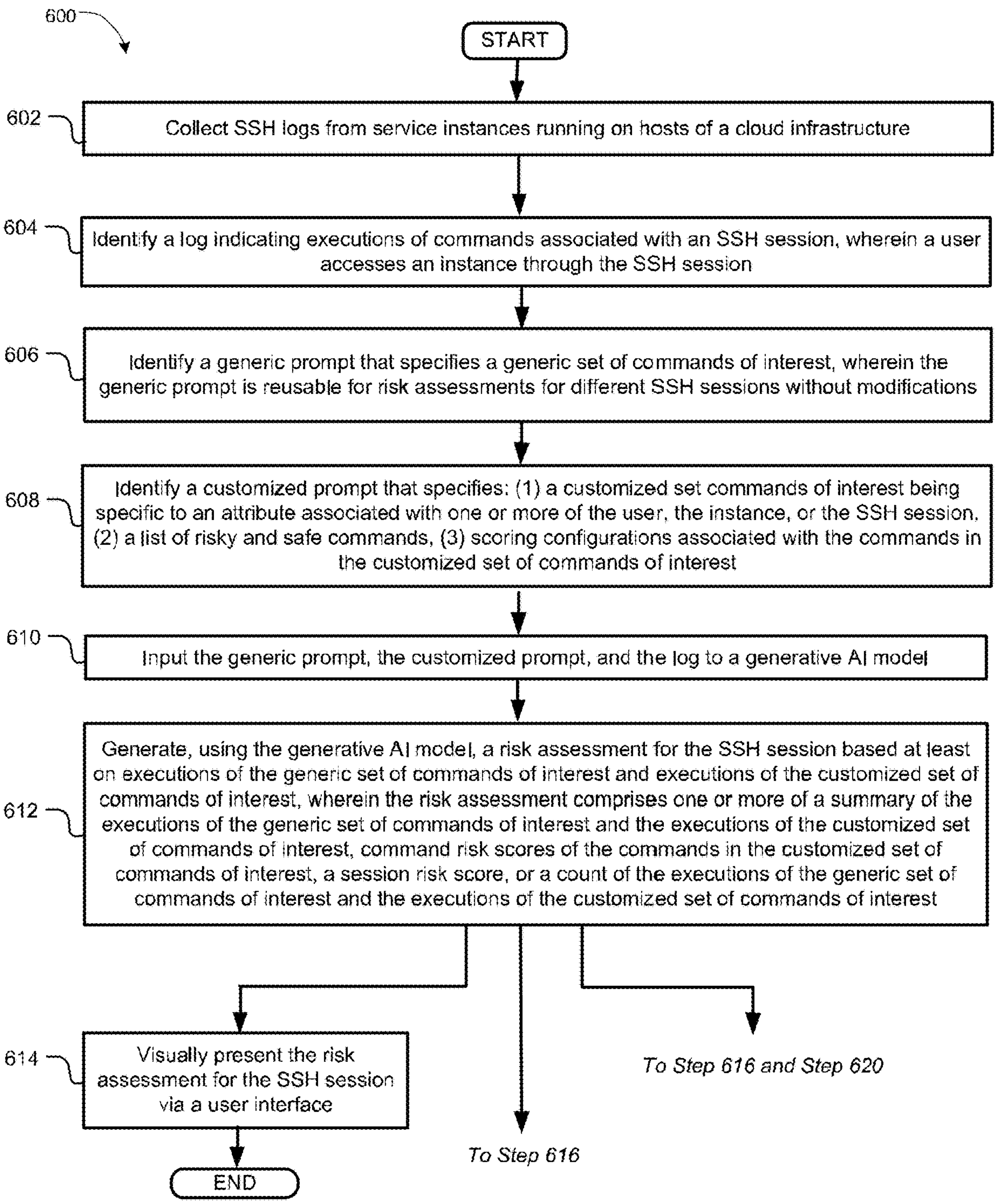
FIGS. 6A-6B illustrate a method for risk assessment of SSH commands, according to at least one embodiment.
Figure 6B:
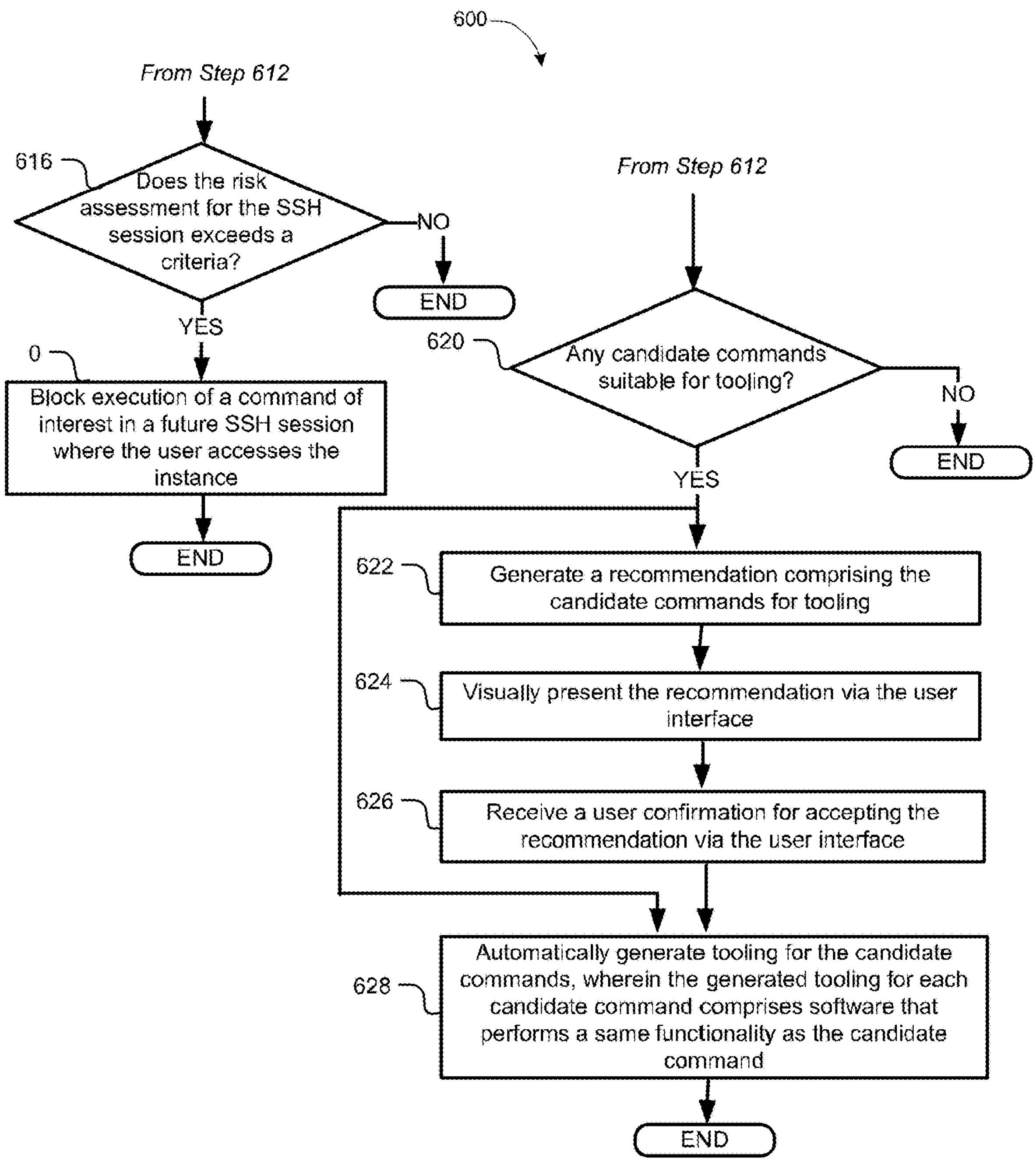

FIGS. 6A-6B illustrate a method 600 for risk assessment of SSH commands, according to at least one embodiment. Method 600 may begin at step 602, where security system (e.g., security system 130 of FIG. 1) may collect SSH logs from service instances running on hosts of a cloud infrastructure. In particular embodiments, security system 130 may access video recordings of shell history data and parse the video recordings to generate logs.

At step 604, security system 130 may identify a log indicating executions of commands associated with an SSH session. A user may access an instance through the SSH session. In particular embodiments, the SSH session may be associated with a specific tenancy.

At step 606, security system 130 may identify a generic prompt that specifies a generic set of commands of interest. The generic prompt can be reusable for risk assessments for different SSH sessions without modifications.

At step 608, security system may identify a customized prompt that specifies: (1) a customized set commands of interest being specific to an attribute associated with one or more of the user, the instance, or the SSH session, (2) a list of risky and safe commands, (3) scoring configurations associated with the commands in the customized set of commands of interest. In particular embodiments, a safe command may be the same as one of the generic set of commands of interest. A risk assessment for the SSH session does not indicate an increased risk due to executions of the safe commands. In particular embodiments, the scoring configuration may include impact levels associated with the commands. Security system 130 may determine an impact level associated with a command based on one or more of a type associated with the command, a function associated with the command, or a context associated with a usage of the command.

At step 610, security system 130 may input the generic prompt, the customized prompt, and the log to a generative AI model.

At step 612, security system 130 may generate, using the generative AI model, a risk assessment for the SSH session based at least on executions of the generic set of commands of interest and executions of the customized set of commands of interest. The risk assessment may include one or more of a summary of the executions of the generic set of commands of interest and the executions of the customized set of commands of interest, command risk scores of the commands in the customized set of commands of interest, a session risk score, or a count of the executions of the generic set of commands of interest and the executions of the customized set of commands of interest.

After step 612, method 600 may proceed to separate flows.

In one flow, at step 614, security system 130 may visually present the risk assessment for the SSH session via a user interface, e.g., a dashboard 300 described with reference to FIGS. 3A-3C. Method 600 may then end.

Method 600 may then proceed to step 616, or step 620, or both steps 616 and 620 in parallel.

In another flow, at step 616, security system 130 may determine whether the risk assessment for the SSH session exceeds one or more criteria. As an example and not by way of limitation, the one or more criteria may be a threshold score for a command risk score in the risk assessment. If the risk assessment for the SSH session exceeds the one or more criteria, security system 130 may block execution of a command of interest in a future SSH session where the user accesses the instance at step 618. The blocking may occur when security system 130 detects one or more of the command, the future SSH session being associated with the user, the future SSH session being associated with the tenancy, or the future SSH session being associated with the instance. Method 600 may then end.

If the risk assessment for the SSH session does not exceed the one or more criteria, method 600 may end.

In yet another flow after step 612, security system 130 may determine whether there are any candidate commands suitable for tooling at step 620. Security system 130 may identity the candidate commands based on one or more of the risk assessment for the SSH session, executions of commands associated with the user, or executions of commands associated with the tenancy.

If there are no candidate commands for tooling, method 600 may end. If there are candidate commands for tooling, method 600 may proceed to step 622 or step 628.

At step 622, security system 130 may generate a recommendation including the candidate commands for tooling.

At step 624, security system 130 may visually present the recommendation via the user interface.

At step 626, security system 130 may receive a user confirmation for accepting the recommendation via the user interface.

Steps 622-626 may be optional as method 600 may proceed from step 620 directly to step 628, where security system may automatically generate tooling for the candidate commands. The generated tooling for a candidate command may include software that performs the same functionality as the candidate command. In particular embodiments, security system 130 may automatically generate the tooling by providing an auto-tooling prompt to a generative AI model. The auto-tooling prompt can be configured to instruct the generative AI model to build an application that has functionalities corresponding to the candidate commands. In an embodiment, the application is programmed to require a user to log into the application using identity and access management (IAM) credentials. In another embodiment, the application is programmed to emit audit logs.

Method 600 may then end.

In particular embodiments, security system 130 may use steps 604-628 for all the logs for risk assessment. For example, security system 130 may identify another log associated with another SSH session. Another user may access another instance via that SSH session. Security system 130 may identify another customized prompt and generate a risk assessment accordingly.

In particular embodiments, security system 130 may use steps 604-628 for a plurality of tenancies. For each tenancy, security system 130 may extract commands associated with that tenancy, identify a customized prompt that specifies a customized set of one or more commands of interest specific to that tenancy, using a generative AI model to generate a risk assessment for that tenancy accordingly, and visually presenting the risk assessments associated with the multiple tenancies via a user interface.

Particular embodiments may repeat one or more steps of the method of FIGS. 6A-6B, where appropriate. Although this disclosure describes and illustrates particular steps of the method of FIGS. 6A-6B as occurring in a particular order, this disclosure contemplates any suitable steps of the method of FIGS. 6A-6B occurring in any suitable order. Moreover, although this disclosure describes and illustrates an example method for risk assessment of SSH commands including the particular steps of the method of FIGS. 6A-6B, this disclosure contemplates any suitable method for risk assessment of SSH commands including any suitable steps, which may include all, some, or none of the steps of the method of FIGS. 6A-6B, where appropriate. Furthermore, although this disclosure describes and illustrates particular components, devices, or systems carrying out particular steps of the method of FIGS. 6A-6B, this disclosure contemplates any suitable combination of any suitable components, devices, or systems carrying out any suitable steps of the method of FIGS. 6A-6B.

The embodiments disclosed herein can be utilized in infrastructure as a service (IaaS). IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 7:
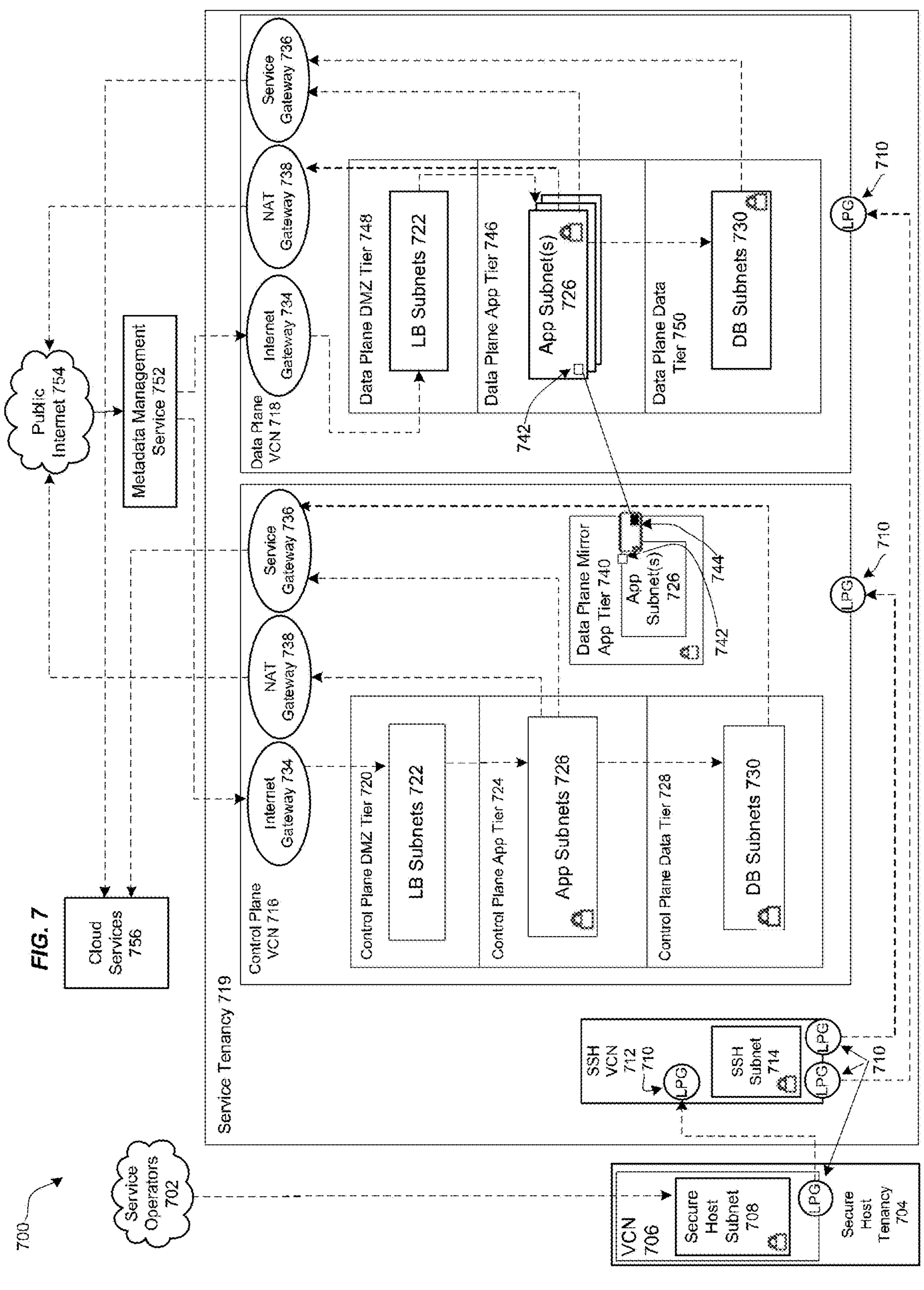
FIG. 7 is a block diagram illustrating an example pattern of an infrastructure as a service (IaaS) architecture, according to at least one embodiment.

FIG. 7 is a block diagram 700 illustrating an example pattern of an IaaS architecture, according to at least one embodiment. Service operators 702 can be communicatively coupled to a secure host tenancy 704 that can include a virtual cloud network (VCN) 706 and a secure host subnet 708. In some examples, the service operators 702 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 706 and/or the Internet.

The VCN 706 can include a local peering gateway (LPG) 710 that can be communicatively coupled to a secure shell (SSH) VCN 712 via an LPG 710 contained in the SSH VCN 712. The SSH VCN 712 can include an SSH subnet 714, and the SSH VCN 712 can be communicatively coupled to a control plane VCN 716 via the LPG 710 contained in the control plane VCN 716. Also, the SSH VCN 712 can be communicatively coupled to a data plane VCN 718 via an LPG 710. The control plane VCN 716 and the data plane VCN 718 can be contained in a service tenancy 719 that can be owned and/or operated by the IaaS provider.

The control plane VCN 716 can include a control plane demilitarized zone (DMZ) tier 720 that acts as a perimeter network (e.g., portions of a corporate network between the corporate intranet and external networks). The DMZ-based servers may have restricted responsibilities and help keep breaches contained. Additionally, the DMZ tier 720 can include one or more load balancer (LB) subnet(s) 722, a control plane app tier 724 that can include app subnet(s) 726, a control plane data tier 728 that can include database (DB) subnet(s) 730 (e.g., frontend DB subnet(s) and/or backend DB subnet(s)). The LB subnet(s) 722 contained in the control plane DMZ tier 720 can be communicatively coupled to the app subnet(s) 726 contained in the control plane app tier 724 and an Internet gateway 734 that can be contained in the control plane VCN 716, and the app subnet(s) 726 can be communicatively coupled to the DB subnet(s) 730 contained in the control plane data tier 728 and a service gateway 736 and a network address translation (NAT) gateway 738. The control plane VCN 716 can include the service gateway 736 and the NAT gateway 738.

The control plane VCN 716 can include a data plane mirror app tier 740 that can include app subnet(s) 726. The app subnet(s) 726 contained in the data plane mirror app tier 740 can include a virtual network interface controller (VNIC) 742 that can execute a compute instance 744. The compute instance 744 can communicatively couple the app subnet(s) 726 of the data plane mirror app tier 740 to app subnet(s) 726 that can be contained in a data plane app tier 746.

The data plane VCN 718 can include the data plane app tier 746, a data plane DMZ tier 748, and a data plane data tier 750. The data plane DMZ tier 748 can include LB subnet(s) 722 that can be communicatively coupled to the app subnet(s) 726 of the data plane app tier 746 and the Internet gateway 734 of the data plane VCN 718. The app subnet(s) 726 can be communicatively coupled to the service gateway 736 of the data plane VCN 718 and the NAT gateway 738 of the data plane VCN 718. The data plane data tier 750 can also include the DB subnet(s) 730 that can be communicatively coupled to the app subnet(s) 726 of the data plane app tier 746.

The Internet gateway 734 of the control plane VCN 716 and of the data plane VCN 718 can be communicatively coupled to a metadata management service 752 that can be communicatively coupled to public Internet 754. Public Internet 754 can be communicatively coupled to the NAT gateway 738 of the control plane VCN 716 and of the data plane VCN 718. The service gateway 736 of the control plane VCN 716 and of the data plane VCN 718 can be communicatively couple to cloud services 756.

In some examples, the service gateway 736 of the control plane VCN 716 or of the data plane VCN 718 can make application programming interface (API) calls to cloud services 756 without going through public Internet 754. The API calls to cloud services 756 from the service gateway 736 can be one-way: the service gateway 736 can make API calls to cloud services 756, and cloud services 756 can send requested data to the service gateway 736. But, cloud services 756 may not initiate API calls to the service gateway 736.

In some examples, the secure host tenancy 704 can be directly connected to the service tenancy 719, which may be otherwise isolated. The secure host subnet 708 can communicate with the SSH subnet 714 through an LPG 710 that may enable two-way communication over an otherwise isolated system. Connecting the secure host subnet 708 to the SSH subnet 714 may give the secure host subnet 708 access to other entities within the service tenancy 719.

The control plane VCN 716 may allow users of the service tenancy 719 to set up or otherwise provision desired resources. Desired resources provisioned in the control plane VCN 716 may be deployed or otherwise used in the data plane VCN 718. In some examples, the control plane VCN 716 can be isolated from the data plane VCN 718, and the data plane mirror app tier 740 of the control plane VCN 716 can communicate with the data plane app tier 746 of the data plane VCN 718 via VNICs 742 that can be contained in the data plane mirror app tier 740 and the data plane app tier 746.

In some examples, users of the system, or customers, can make requests, for example create, read, update, or delete (CRUD) operations, through public Internet 754 that can communicate the requests to the metadata management service 752. The metadata management service 752 can communicate the request to the control plane VCN 716 through the Internet gateway 734. The request can be received by the LB subnet(s) 722 contained in the control plane DMZ tier 720. The LB subnet(s) 722 may determine that the request is valid, and in response to this determination, the LB subnet(s) 722 can transmit the request to app subnet(s) 726 contained in the control plane app tier 724. If the request is validated and requires a call to public Internet 754, the call to public Internet 754 may be transmitted to the NAT gateway 738 that can make the call to public Internet 754. Metadata that may be desired to be stored by the request can be stored in the DB subnet(s) 730.

In some examples, the data plane mirror app tier 740 can facilitate direct communication between the control plane VCN 716 and the data plane VCN 718. For example, changes, updates, or other suitable modifications to configuration may be desired to be applied to the resources contained in the data plane VCN 718. Via a VNIC 742, the control plane VCN 716 can directly communicate with, and can thereby execute the changes, updates, or other suitable modifications to configuration to, resources contained in the data plane VCN 718.

In some embodiments, the control plane VCN 716 and the data plane VCN 718 can be contained in the service tenancy 719. In this case, the user, or the customer, of the system may not own or operate either the control plane VCN 716 or the data plane VCN 718. Instead, the IaaS provider may own or operate the control plane VCN 716 and the data plane VCN 718, both of which may be contained in the service tenancy 719. This embodiment can enable isolation of networks that may prevent users or customers from interacting with other users', or other customers', resources. Also, this embodiment may allow users or customers of the system to store databases privately without needing to rely on public Internet 754, which may not have a desired level of threat prevention, for storage.

In other embodiments, the LB subnet(s) 722 contained in the control plane VCN 716 can be configured to receive a signal from the service gateway 736. In this embodiment, the control plane VCN 716 and the data plane VCN 718 may be configured to be called by a customer of the IaaS provider without calling public Internet 754. Customers of the IaaS provider may desire this embodiment since database(s) that the customers use may be controlled by the IaaS provider and may be stored on the service tenancy 719, which may be isolated from public Internet 754.

Figure 8:
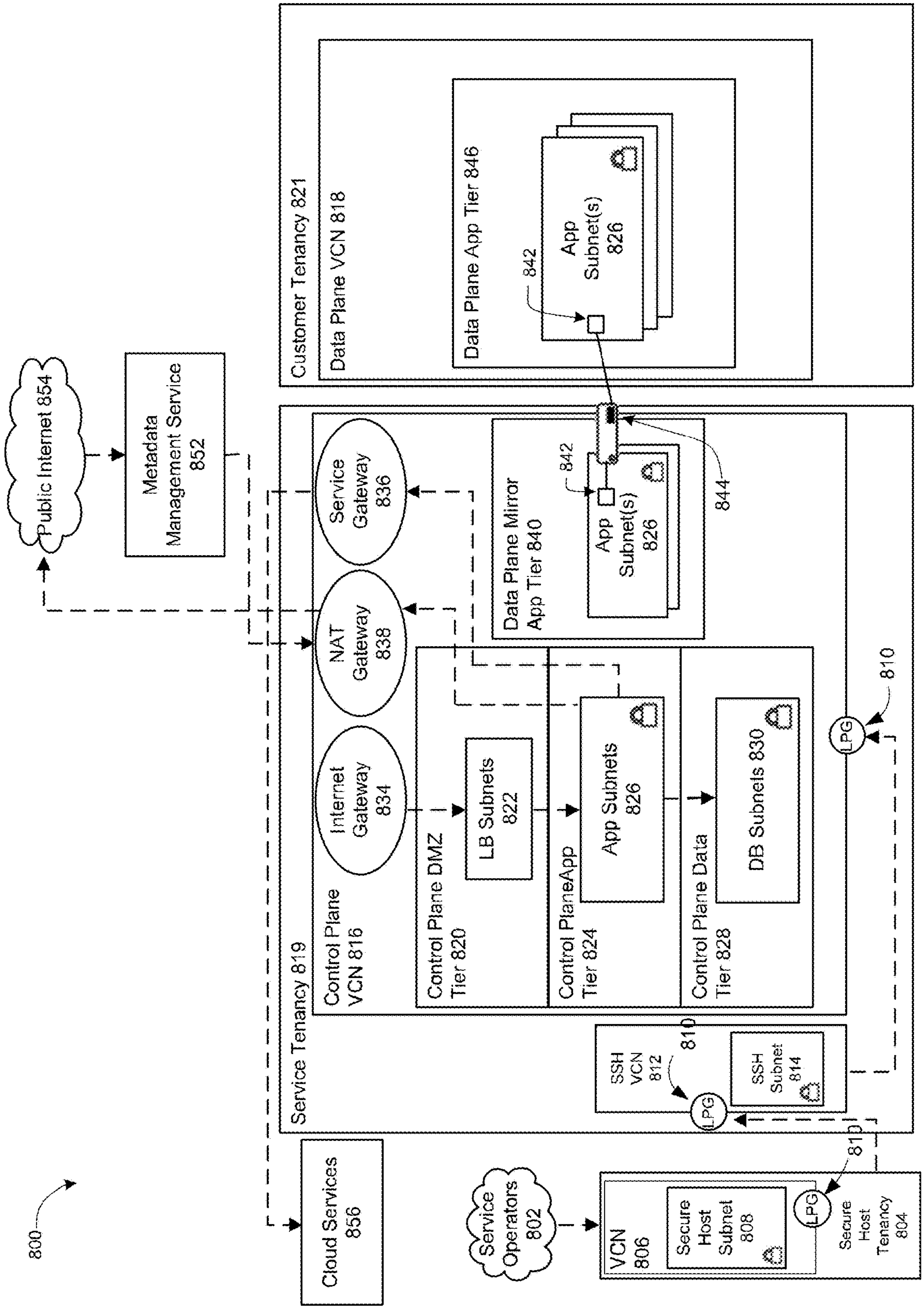
FIG. 8 is a block diagram illustrating another example pattern of an IaaS architecture, according to at least one embodiment.

FIG. 8 is a block diagram 800 illustrating another example pattern of an IaaS architecture, according to at least one embodiment. Service operators 802 (e.g., service operators 702 of FIG. 7) can be communicatively coupled to a secure host tenancy 804 (e.g., the secure host tenancy 704 of FIG. 7) that can include a virtual cloud network (VCN) 806 (e.g., the VCN 706 of FIG. 7) and a secure host subnet 808 (e.g., the secure host subnet 708 of FIG. 7). The VCN 806 can include a local peering gateway (LPG) 810 (e.g., the LPG 710 of FIG. 7) that can be communicatively coupled to a secure shell (SSH) VCN 812 (e.g., the SSH VCN 712 of FIG. 7) via an LPG 710 contained in the SSH VCN 812. The SSH VCN 812 can include an SSH subnet 814 (e.g., the SSH subnet 714 of FIG. 7), and the SSH VCN 812 can be communicatively coupled to a control plane VCN 816 (e.g., the control plane VCN 716 of FIG. 7) via an LPG 810 contained in the control plane VCN 816. The control plane VCN 816 can be contained in a service tenancy 819 (e.g., the service tenancy 719 of FIG. 7), and the data plane VCN 818 (e.g., the data plane VCN 718 of FIG. 7) can be contained in a customer tenancy 821 that may be owned or operated by users, or customers, of the system.

The control plane VCN 816 can include a control plane DMZ tier 820 (e.g., the control plane DMZ tier 720 of FIG. 7) that can include LB subnet(s) 822 (e.g., LB subnet(s) 722 of FIG. 7), a control plane app tier 824 (e.g., the control plane app tier 724 of FIG. 7) that can include app subnet(s) 826 (e.g., app subnet(s) 726 of FIG. 7), a control plane data tier 828 (e.g., the control plane data tier 728 of FIG. 7) that can include database (DB) subnet(s) 830 (e.g., similar to DB subnet(s) 730 of FIG. 7). The LB subnet(s) 822 contained in the control plane DMZ tier 820 can be communicatively coupled to the app subnet(s) 826 contained in the control plane app tier 824 and an Internet gateway 834 (e.g., the Internet gateway 734 of FIG. 7) that can be contained in the control plane VCN 816, and the app subnet(s) 826 can be communicatively coupled to the DB subnet(s) 830 contained in the control plane data tier 828 and a service gateway 836 (e.g., the service gateway 736 of FIG. 7) and a network address translation (NAT) gateway 838 (e.g., the NAT gateway 738 of FIG. 7). The control plane VCN 816 can include the service gateway 836 and the NAT gateway 838.

The control plane VCN 816 can include a data plane mirror app tier 840 (e.g., the data plane mirror app tier 740 of FIG. 7) that can include app subnet(s) 826. The app subnet(s) 826 contained in the data plane mirror app tier 840 can include a virtual network interface controller (VNIC) 842 (e.g., the VNIC of 742) that can execute a compute instance 844 (e.g., similar to the compute instance 744 of FIG. 7). The compute instance 844 can facilitate communication between the app subnet(s) 826 of the data plane mirror app tier 840 and the app subnet(s) 826 that can be contained in a data plane app tier 846 (e.g., the data plane app tier 746 of FIG. 7) via the VNIC 842 contained in the data plane mirror app tier 840 and the VNIC 842 contained in the data plane app tier 846.

The Internet gateway 834 contained in the control plane VCN 816 can be communicatively coupled to a metadata management service 852 (e.g., the metadata management service 752 of FIG. 7) that can be communicatively coupled to public Internet 854 (e.g., public Internet 754 of FIG. 7). Public Internet 854 can be communicatively coupled to the NAT gateway 838 contained in the control plane VCN 816. The service gateway 836 contained in the control plane VCN 816 can be communicatively couple to cloud services 856 (e.g., cloud services 756 of FIG. 7).

In some examples, the data plane VCN 818 can be contained in the customer tenancy 821. In this case, the IaaS provider may provide the control plane VCN 816 for each customer, and the IaaS provider may, for each customer, set up a unique compute instance 844 that is contained in the service tenancy 819. Each compute instance 844 may allow communication between the control plane VCN 816, contained in the service tenancy 819, and the data plane VCN 818 that is contained in the customer tenancy 821. The compute instance 844 may allow resources, that are provisioned in the control plane VCN 816 that is contained in the service tenancy 819, to be deployed or otherwise used in the data plane VCN 818 that is contained in the customer tenancy 821.

In other examples, the customer of the IaaS provider may have databases that live in the customer tenancy 821. In this example, the control plane VCN 816 can include the data plane mirror app tier 840 that can include app subnet(s) 826. The data plane mirror app tier 840 can reside in the data plane VCN 818, but the data plane mirror app tier 840 may not live in the data plane VCN 818. That is, the data plane mirror app tier 840 may have access to the customer tenancy 821, but the data plane mirror app tier 840 may not exist in the data plane VCN 818 or be owned or operated by the customer of the IaaS provider. The data plane mirror app tier 840 may be configured to make calls to the data plane VCN 818 but may not be configured to make calls to any entity contained in the control plane VCN 816. The customer may desire to deploy or otherwise use resources in the data plane VCN 818 that are provisioned in the control plane VCN 816, and the data plane mirror app tier 840 can facilitate the desired deployment, or other usage of resources, of the customer.

In some embodiments, the customer of the IaaS provider can apply filters to the data plane VCN 818. In this embodiment, the customer can determine what the data plane VCN 818 can access, and the customer may restrict access to public Internet 854 from the data plane VCN 818. The IaaS provider may not be able to apply filters or otherwise control access of the data plane VCN 818 to any outside networks or databases. Applying filters and controls by the customer onto the data plane VCN 818, contained in the customer tenancy 821, can help isolate the data plane VCN 818 from other customers and from public Internet 854.

In some embodiments, cloud services 856 can be called by the service gateway 836 to access services that may not exist on public Internet 854, on the control plane VCN 816, or on the data plane VCN 818. The connection between cloud services 856 and the control plane VCN 816 or the data plane VCN 818 may not be live or continuous. Cloud services 856 may exist on a different network owned or operated by the IaaS provider. Cloud services 856 may be configured to receive calls from the service gateway 836 and may be configured to not receive calls from public Internet 854. Some cloud services 856 may be isolated from other cloud services 856, and the control plane VCN 816 may be isolated from cloud services 856 that may not be in the same region as the control plane VCN 816. For example, the control plane VCN 816 may be located in "Region 1," and cloud service "Deployment 7," may be located in Region 1 and in "Region 2." If a call to Deployment 7 is made by the service gateway 836 contained in the control plane VCN 816 located in Region 1, the call may be transmitted to Deployment 7 in Region 1. In this example, the control plane VCN 816, or Deployment 7 in Region 1, may not be communicatively coupled to, or otherwise in communication with, Deployment 7 in Region 2.

Figure 9:
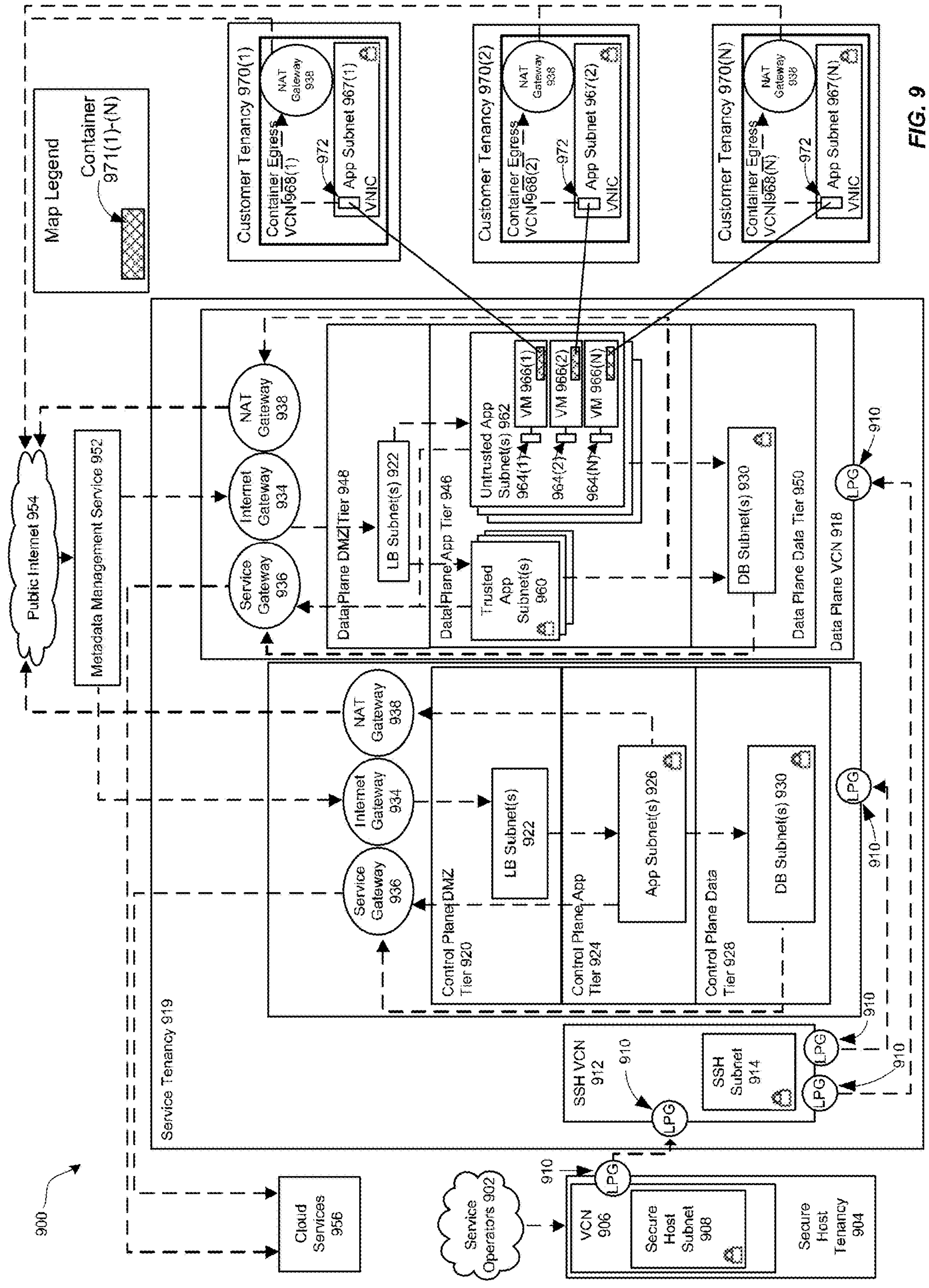
FIG. 9 is a block diagram illustrating another example pattern of an IaaS architecture, according to at least one embodiment.

FIG. 9 is a block diagram 900 illustrating another example pattern of an IaaS architecture, according to at least one embodiment. Service operators 902 (e.g., service operators 702 of FIG. 7) can be communicatively coupled to a secure host tenancy 904 (e.g., the secure host tenancy 704 of FIG. 7) that can include a virtual cloud network (VCN) 906 (e.g., the VCN 706 of FIG. 7) and a secure host subnet 908 (e.g., the secure host subnet 708 of FIG. 7). The VCN 906 can include an LPG 910 (e.g., the LPG 710 of FIG. 7) that can be communicatively coupled to an SSH VCN 912 (e.g., the SSH VCN 712 of FIG. 7) via an LPG 910 contained in the SSH VCN 912. The SSH VCN 912 can include an SSH subnet 914 (e.g., the SSH subnet 714 of FIG. 7), and the SSH VCN 912 can be communicatively coupled to a control plane VCN 916 (e.g., the control plane VCN 716 of FIG. 7) via an LPG 910 contained in the control plane VCN 916 and to a data plane VCN 918 (e.g., the data plane 718 of FIG. 7) via an LPG 910 contained in the data plane VCN 918. The control plane VCN 916 and the data plane VCN 918 can be contained in a service tenancy 919 (e.g., the service tenancy 719 of FIG. 7).

The control plane VCN 916 can include a control plane DMZ tier 920 (e.g., the control plane DMZ tier 720 of FIG. 7) that can include load balancer (LB) subnet(s) 922 (e.g., LB subnet(s) 722 of FIG. 7), a control plane app tier 924 (e.g., the control plane app tier 724 of FIG. 7) that can include app subnet(s) 926 (e.g., similar to app subnet(s) 726 of FIG. 7), a control plane data tier 928 (e.g., the control plane data tier 728 of FIG. 7) that can include DB subnet(s) 930. The LB subnet(s) 922 contained in the control plane DMZ tier 920 can be communicatively coupled to the app subnet(s) 926 contained in the control plane app tier 924 and to an Internet gateway 934 (e.g., the Internet gateway 734 of FIG. 7) that can be contained in the control plane VCN 916, and the app subnet(s) 926 can be communicatively coupled to the DB subnet(s) 930 contained in the control plane data tier 928 and to a service gateway 936 (e.g., the service gateway of FIG. 7) and a network address translation (NAT) gateway 938 (e.g., the NAT gateway 738 of FIG. 7). The control plane VCN 916 can include the service gateway 936 and the NAT gateway 938.

The data plane VCN 918 can include a data plane app tier 946 (e.g., the data plane app tier 746 of FIG. 7), a data plane DMZ tier 948 (e.g., the data plane DMZ tier 748 of FIG. 7), and a data plane data tier 950 (e.g., the data plane data tier 750 of FIG. 7). The data plane DMZ tier 948 can include LB subnet(s) 922 that can be communicatively coupled to trusted app subnet(s) 960 and untrusted app subnet(s) 962 of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include one or more primary VNICs 964(1)-(N) that can be communicatively coupled to tenant virtual machines (VMs) 966(1)-(N). Each tenant VM 966(1)-(N) can be communicatively coupled to a respective app subnet 967(1)-(N) that can be contained in respective container egress VCNs 968(1)-(N) that can be contained in respective customer tenancies 970(1)-(N). Respective secondary VNICs 972(1)-(N) can facilitate communication between the untrusted app subnet(s) 962 contained in the data plane VCN 918 and the app subnet contained in the container egress VCNs 968(1)-(N). Each container egress VCNs 968(1)-(N) can include a NAT gateway 938 that can be communicatively coupled to public Internet 954 (e.g., public Internet 754 of FIG. 7).

The Internet gateway 934 contained in the control plane VCN 916 and contained in the data plane VCN 918 can be communicatively coupled to a metadata management service 952 (e.g., the metadata management system 752 of FIG. 7) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some embodiments, the data plane VCN 918 can be integrated with customer tenancies 970. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 946. Code to run the function may be executed in the VMs 966(1)-(N), and the code may not be configured to run anywhere else on the data plane VCN 918. Each VM 966(1)-(N) may be connected to one customer tenancy 970. Respective containers 971(1)-(N) contained in the VMs 966(1)-(N) may be configured to run the code. In this case, there can be a dual isolation (e.g., the containers 971(1)-(N) running code, where the containers 971(1)-(N) may be contained in at least the VM 966(1)-(N) that are contained in the untrusted app subnet(s) 962), which may help prevent incorrect or otherwise undesirable code from damaging the network of the IaaS provider or from damaging a network of a different customer. The containers 971(1)-(N) may be communicatively coupled to the customer tenancy 970 and may be configured to transmit or receive data from the customer tenancy 970. The containers 971(1)-(N) may not be configured to transmit or receive data from any other entity in the data plane VCN 918. Upon completion of running the code, the IaaS provider may kill or otherwise dispose of the containers 971(1)-(N).

In some embodiments, the trusted app subnet(s) 960 may run code that may be owned or operated by the IaaS provider. In this embodiment, the trusted app subnet(s) 960 may be communicatively coupled to the DB subnet(s) 930 and be configured to execute CRUD operations in the DB subnet(s) 930. The untrusted app subnet(s) 962 may be communicatively coupled to the DB subnet(s) 930, but in this embodiment, the untrusted app subnet(s) may be configured to execute read operations in the DB subnet(s) 930. The containers 971(1)-(N) that can be contained in the VM 966(1)-(N) of each customer and that may run code from the customer may not be communicatively coupled with the DB subnet(s) 930.

In other embodiments, the control plane VCN 916 and the data plane VCN 918 may not be directly communicatively coupled. In this embodiment, there may be no direct communication between the control plane VCN 916 and the data plane VCN 918. However, communication can occur indirectly through at least one method. An LPG 910 may be established by the IaaS provider that can facilitate communication between the control plane VCN 916 and the data plane VCN 918. In another example, the control plane VCN 916 or the data plane VCN 918 can make a call to cloud services 956 via the service gateway 936. For example, a call to cloud services 956 from the control plane VCN 916 can include a request for a service that can communicate with the data plane VCN 918.

Figure 10:
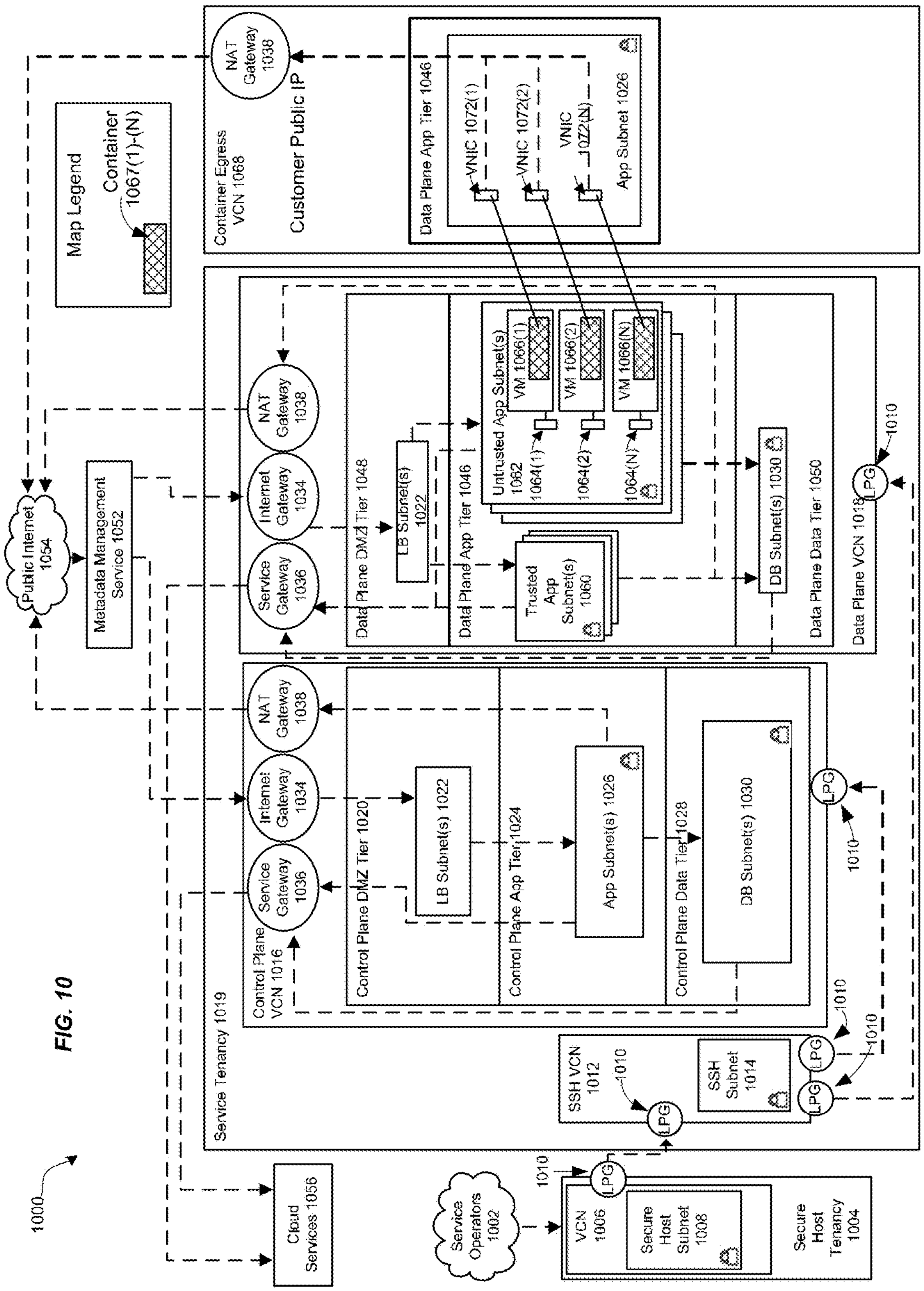
FIG. 10 is a block diagram illustrating another example pattern of an IaaS architecture, according to at least one embodiment.

FIG. 10 is a block diagram 1000 illustrating another example pattern of an IaaS architecture, according to at least one embodiment. Service operators 1002 (e.g., service operators 702 of FIG. 7) can be communicatively coupled to a secure host tenancy 1004 (e.g., the secure host tenancy 704 of FIG. 7) that can include a virtual cloud network (VCN) 1006 (e.g., the VCN 706 of FIG. 7) and a secure host subnet 1008 (e.g., the secure host subnet 708 of FIG. 7). The VCN 1006 can include an LPG 1010 (e.g., the LPG 710 of FIG. 7) that can be communicatively coupled to an SSH VCN 1012 (e.g., the SSH VCN 712 of FIG. 7) via an LPG 1010 contained in the SSH VCN 1012. The SSH VCN 1012 can include an SSH subnet 1014 (e.g., the SSH subnet 714 of FIG. 7), and the SSH VCN 1012 can be communicatively coupled to a control plane VCN 1016 (e.g., the control plane VCN 716 of FIG. 7) via an LPG 1010 contained in the control plane VCN 1016 and to a data plane VCN 1018 (e.g., the data plane 718 of FIG. 7) via an LPG 1010 contained in the data plane VCN 1018. The control plane VCN 1016 and the data plane VCN 1018 can be contained in a service tenancy 1019 (e.g., the service tenancy 719 of FIG. 7).

The control plane VCN 1016 can include a control plane DMZ tier 1020 (e.g., the control plane DMZ tier 720 of FIG. 7) that can include LB subnet(s) 1022 (e.g., LB subnet(s) 722 of FIG. 7), a control plane app tier 1024 (e.g., the control plane app tier 724 of FIG. 7) that can include app subnet(s) 1026 (e.g., app subnet(s) 726 of FIG. 7), a control plane data tier 1028 (e.g., the control plane data tier 728 of FIG. 7) that can include DB subnet(s) 1030 (e.g., DB subnet(s) 930 of FIG. 9). The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 734 of FIG. 7) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 7) and a network address translation (NAT) gateway 1038 (e.g., the NAT gateway 738 of FIG. 7). The control plane VCN 1016 can include the service gateway 1036 and the NAT gateway 1038.

The data plane VCN 1018 can include a data plane app tier 1046 (e.g., the data plane app tier 746 of FIG. 7), a data plane DMZ tier 1048 (e.g., the data plane DMZ tier 748 of FIG. 7), and a data plane data tier 1050 (e.g., the data plane data tier 750 of FIG. 7). The data plane DMZ tier 1048 can include LB subnet(s) 1022 that can be communicatively coupled to trusted app subnet(s) 1060 (e.g., trusted app subnet(s) 960 of FIG. 9) and untrusted app subnet(s) 1062 (e.g., untrusted app subnet(s) 962 of FIG. 9) of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include primary VNICs 1064(1)-(N) that can be communicatively coupled to tenant virtual machines (VMs) 1066(1)-(N) residing within the untrusted app subnet(s) 1062. Each tenant VM 1066(1)-(N) can run code in a respective container 1067(1)-(N), and be communicatively coupled to an app subnet 1026 that can be contained in a data plane app tier 1046 that can be contained in a container egress VCN 1068. Respective secondary VNICs 1072(1)-(N) can facilitate communication between the untrusted app subnet(s) 1062 contained in the data plane VCN 1018 and the app subnet contained in the container egress VCN 1068. The container egress VCN can include a NAT gateway 1038 that can be communicatively coupled to public Internet 1054 (e.g., public Internet 754 of FIG. 7).

The Internet gateway 1034 contained in the control plane VCN 1016 and contained in the data plane VCN 1018 can be communicatively coupled to a metadata management service 1052 (e.g., the metadata management system 752 of FIG. 7) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some examples, the pattern illustrated by the architecture of block diagram 1000 of FIG. 10 may be considered an exception to the pattern illustrated by the architecture of block diagram 900 of FIG. 9 and may be desirable for a customer of the IaaS provider if the IaaS provider cannot directly communicate with the customer (e.g., a disconnected region). The respective containers 1067(1)-(N) that are contained in the VMs 1066(1)-(N) for each customer can be accessed in real-time by the customer. The containers 1067(1)-(N) may be configured to make calls to respective secondary VNICs 1072(1)-(N) contained in app subnet(s) 1026 of the data plane app tier 1046 that can be contained in the container egress VCN 1068. The secondary VNICs 1072(1)-(N) can transmit the calls to the NAT gateway 1038 that may transmit the calls to public Internet 1054. In this example, the containers 1067(1)-(N) that can be accessed in real-time by the customer can be isolated from the control plane VCN 1016 and can be isolated from other entities contained in the data plane VCN 1018. The containers 1067(1)-(N) may also be isolated from resources from other customers.

In other examples, the customer can use the containers 1067(1)-(N) to call cloud services 1056. In this example, the customer may run code in the containers 1067(1)-(N) that requests a service from cloud services 1056. The containers 1067(1)-(N) can transmit this request to the secondary VNICs 1072(1)-(N) that can transmit the request to the NAT gateway that can transmit the request to public Internet 1054. Public Internet 1054 can transmit the request to LB subnet(s) 1022 contained in the control plane VCN 1016 via the Internet gateway 1034. In response to determining the request is valid, the LB subnet(s) can transmit the request to app subnet(s) 1026 that can transmit the request to cloud services 1056 via the service gateway 1036.

It should be appreciated that IaaS architectures 700, 800, 900, 1000 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 11:
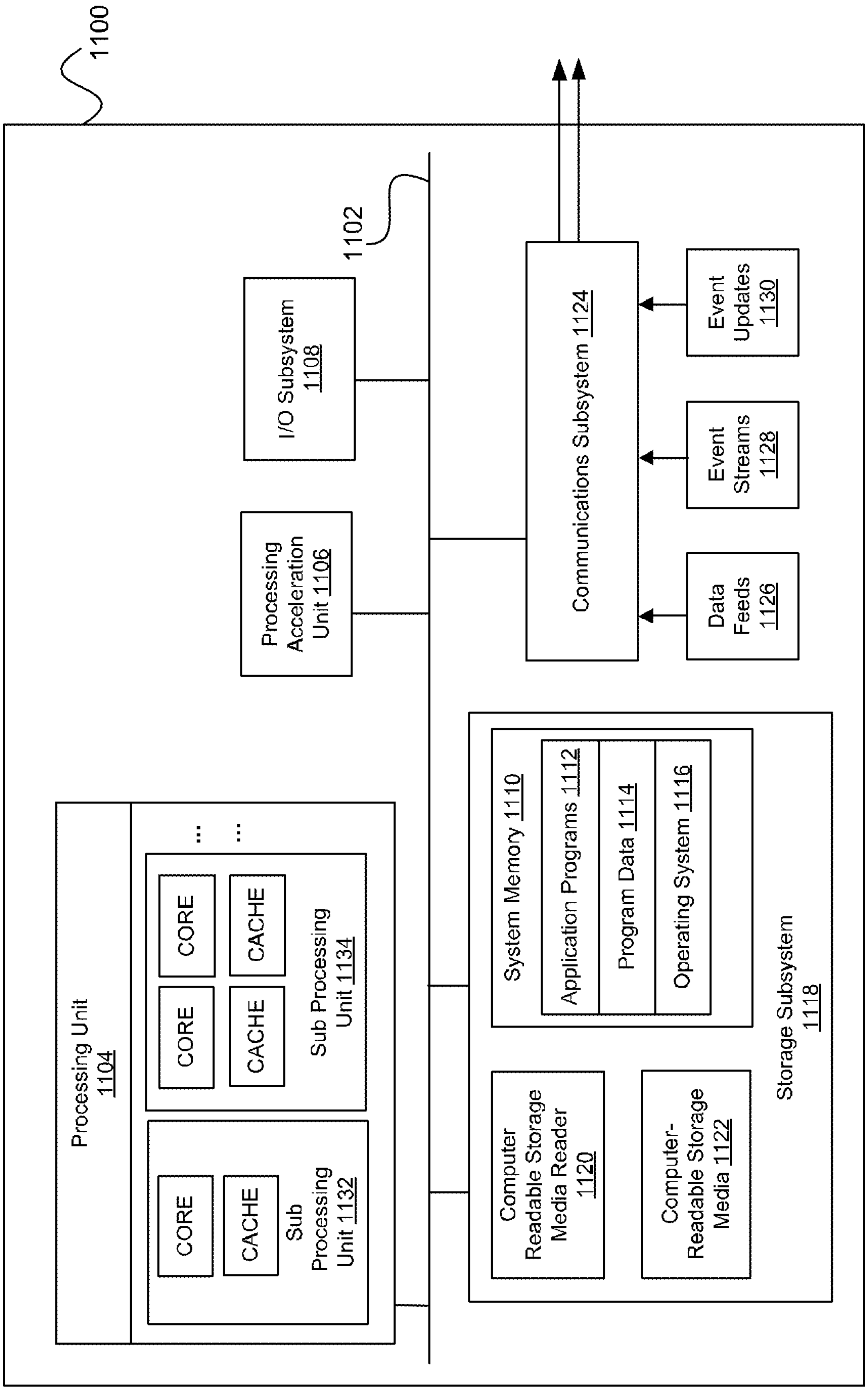
FIG. 11 illustrates an example computer system, in which various embodiments may be implemented.

FIG. 11 illustrates an example computer system 1100, in which various embodiments may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1104 provide the functionality described above. Storage subsystem 1118 may also provide a repository for storing data used in accordance with the present disclosure.

As depicted in the example in FIG. 11, storage subsystem 1118 can include various components including a system memory 1110, computer-readable storage media 1122, and a computer readable storage media reader 1120. System memory 1110 may store program instructions that are loadable and executable by processing unit 1104. System memory 1110 may also store data that is used during the execution of the instructions and/or data that is generated during the execution of the program instructions. Various different kinds of programs may be loaded into system memory 1110 including but not limited to client applications, Web browsers, mid-tier applications, relational database management systems (RDBMS), virtual machines, containers, etc.

System memory 1110 may also store an operating system 1116. Examples of operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1100 executes one or more virtual machines, the virtual machines along with their guest operating systems (GOSs) may be loaded into system memory 1110 and executed by one or more processors or cores of processing unit 1104.

System memory 1110 can come in different configurations depending upon the type of computer system 1100. For example, system memory 1110 may be volatile memory (such as random access memory (RAM)) and/or non-volatile memory (such as read-only memory (ROM), flash memory, etc.) Different types of RAM configurations may be provided including a static random access memory (SRAM), a dynamic random access memory (DRAM), and others. In some implementations, system memory 1110 may include a basic input/output system (BIOS) containing basic routines that help to transfer information between elements within computer system 1100, such as during start-up.

Computer-readable storage media 1122 may represent remote, local, fixed, and/or removable storage devices plus storage media for temporarily and/or more permanently containing, storing, computer-readable information for use by computer system 1100 including instructions executable by processing unit 1104 of computer system 1100.

Computer-readable storage media 1122 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Machine-readable instructions executable by one or more processors or cores of processing unit 1104 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. One or more computer-readable non-transitory storage media embodying software that is operable when executed to:

identify a first log indicating executions of a plurality of commands associated with a first secure shell (SSH) session, wherein a first user accesses a first instance through the first SSH session;

identify a generic prompt that specifies a generic set of commands of interest;

identify a first customized prompt that specifies a first customized set of commands of interest, the first customized set of commands of interest being specific to an attribute associated with one or more of the first user, the first instance, or the first SSH session;

input the generic prompt, the first customized prompt, and the first log to a generative AI model; and generate, using the generative AI model, a risk assessment for the first SSH session based at least on one or more executions of the generic set of commands of interest and one or more executions of the first customized set of commands of interest from the executions of the plurality of commands in the first log.

2. The media of claim 1, wherein the first customized prompt further specifies a scoring configuration for determining a command risk score for a command of the first customized set of commands of interest, and wherein generating the risk assessment for the first SSH session comprises determining the command risk score based on the scoring configuration specified by the first customized prompt.

3. The media of claim 2, wherein the software is further operable when executed to:

determine an impact level associated with the command of the first customized set of commands of interest based on one or more of a type associated with the command, a function associated with the command, or a context associated with a usage of the command;

wherein the scoring configuration comprises the impact level associated with the command, and wherein the command risk score is determined further based on the impact level associated with the command.

4. The media of claim 1, wherein the risk assessment for the first SSH session comprises one or more of (1) a summary of the executions of the generic set of commands of interest and the executions of the first customized set of commands of interest in the first log, or (2) a session risk score determined based on the executions of the generic set of commands of interest and the executions of the first customized set of commands of interest in the first log, or (3) a count of the executions of the generic set of commands of interest and the executions of the first customized set of commands of interest in the first log.

5. The media of claim 1, wherein the first customized prompt further specifies a safe command, and the safe command is same as one of the generic set of commands of interest, and wherein the risk assessment for the first SSH session does not indicate an increased risk due to executions of the safe command.

6. The media of claim 1, wherein the generic prompt is configured to instruct the generative AI model to determine a first category for a first command of the generic set of commands of interest among a plurality of categories and determine a first category risk score for the first category, and wherein the software is further operable when executed to:

determine, using the generative AI model, a second category associated with a second command of the first customized set of commands of interest; and determine, using the generative AI model, a second category risk score for the second category.

7. The media of claim 6, wherein the generic prompt is further configured to instruct the generative AI model to generate the risk assessment for the first SSH session based on the first category risk score associated with the first command, and wherein the software is further operable when executed to:

generate, using the generative AI model, one or more of a summary of the second category or a session risk score of the first SSH session determined based on the second category risk score.

8. The media of claim 6, wherein the first customized prompt further specifies a scoring configuration for determining a command risk score for a command of the first customized set of commands of interest, wherein the scoring configuration comprises a category weight associated with the second category, and wherein the software is further operable when executed to:

determine a second command risk score for the second command based on the category weight associated with the second category.

9. The media of claim 1, wherein the software is further operable when executed to:

responsive to determining that the risk assessment for the first SSH session exceeds one or more criteria, block execution of a command of interest in a future SSH session where the first user accesses the first instance.

10. The media of claim 1, wherein the software is further operable when executed to:

access one or more video recordings associated with the first SSH session;

parse the one or more video recordings to generate the first log;

extract timeseries data from the first SSH session; and generate activity tracking the first customized set of commands of interest based on the timeseries data.

11. The media of claim 1, wherein the generic prompt is reusable for risk assessments for different SSH sessions without modifications, wherein the software is further operable when executed to:

identify a second log indicating executions of a plurality of commands associated with a second secure shell (SSH) session, wherein a second user accesses a second instance via the second SSH session;

identify a second customized prompt that specifies a second customized set of commands of interest, the second customized set of commands of interest being specific to one or more of the second user, the second instance, or the second SSH session;

input the generic prompt, the second customized prompt, and the second log to the generative AI model; and generate, using the generative AI model, a risk assessment for the second SSH session based at least on one or more executions of the generic set of commands of interest and one or more executions of the second customized set of commands of interest from the executions of the plurality of commands in the second log.

12. The media of claim 1, wherein the software is further operable when executed to:

identify a plurality of logs associated with a plurality of SSH sessions, wherein each of the logs indicates executions of a plurality of commands, and wherein the plurality of SSH sessions are associated with a plurality of tenancies;

for each of the plurality of tenancies:

extract commands associated with that tenancy;

identify a customized prompt that specifies a customized set of commands of interest, the customized set of commands of interest being specific to that tenancy;

input the generic prompt, the customized prompt, and the extracted commands to the generative AI model; and generate, using the generative AI model, a risk assessment for that tenancy based at least on one or more executions of the generic set of commands of interest and one or more executions of the extracted commands; and visually presenting the plurality of risk assessments associated with the plurality of tenancies via a user interface.

13. The media of claim 1, wherein the software is further operable when executed to:

based at least on the risk assessment for the first SSH session, identify one or more candidate commands from the plurality of commands for tooling; and generate a recommendation comprising the one or more candidate commands for tooling.

14. The media of claim 13, wherein identifying the one or more candidate commands is further based on executions of commands associated with the first user.

15. The media of claim 13, wherein the first SSH session is associated with a first tenancy, and wherein identifying the one or more candidate commands is further based on executions of commands associated with the first tenancy.

16. The media of claim 13, wherein the software is further operable when executed to:

block execution of the one or more candidate commands in a future SSH session in response to detecting the one or more candidate commands, the future SSH session being associated with the first user, the future SSH session being associated with a tenancy associated with the first user, or the future SSH session being associated with an instance accessed by the first SSH session.

17. The media of claim 13, wherein the software is further operable when executed to:

based on the recommendation, automatically generate tooling for the one or more candidate commands, wherein the generated tooling for a first candidate command of the one or more candidate commands comprises software that performs a same functionality as the first candidate command.

18. The media of claim 17, wherein automatically generating the tooling for the one or more candidate commands comprises providing an auto-tooling prompt to a generative artificial-intelligence (AI) model.

19. The media of claim 18, wherein the auto-tooling prompt is configured to instruct the generative AI model to build an application that has functionalities corresponding to the one or more candidate commands, and where the application is programmed to require a user to log into the application using identity and access management (IAM) credentials.

20. The media of claim 19, wherein the auto-tooling prompt is configured to instruct the generative AI model to build an application that has functionalities corresponding to the one or more candidate commands, and wherein the application is programmed to emit audit logs.

21. A system comprising: one or more processors; and a non-transitory memory coupled to the processors comprising instructions, when executed using the processors, cause the processors to execute:

identifying a first log indicating executions of a plurality of commands associated with a first secure shell (SSH) session, wherein a first user accesses a first instance through the first SSH session;

identifying a generic prompt that specifies a generic set of commands of interest;

identifying a first customized prompt that specifies a first customized set of commands of interest, the first customized set of commands of interest being specific to an attribute associated with one or more of the first user, the first instance, or the first SSH session;

inputting the generic prompt, the first customized prompt, and the first log to a generative AI model; and generating, using the generative AI model, a risk assessment for the first SSH session based at least on one or more executions of the generic set of commands of interest and one or more executions of the first customized set of commands of interest from the executions of the plurality of commands in the first log.

22. A method comprising, by one or more computing system:

identifying a first log indicating executions of a plurality of commands associated with a first secure shell (SSH) session, wherein a first user accesses a first instance through the first SSH session;

identifying a generic prompt that specifies a generic set of commands of interest;

identifying a first customized prompt that specifies a first customized set of commands of interest, the first customized set of commands of interest being specific to an attribute associated with one or more of the first user, the first instance, or the first SSH session;

inputting the generic prompt, the first customized prompt, and the first log to a generative AI model; and generating, using the generative AI model, a risk assessment for the first SSH session based at least on one or more executions of the generic set of commands of interest and one or more executions of the first customized set of commands of interest from the executions of the plurality of commands in the first log.

* * * * *